US009852488B2

(12) United States Patent
Amaitis et al.

(10) Patent No.: US 9,852,488 B2
(45) Date of Patent: Dec. 26, 2017

(54) BETTING ON A SUBSET OF PARTICIPANTS IN AN EVENT

(75) Inventors: Lee M. Amaitis, London (GB); Joseph M. Asher, Las Vegas, NV (US); Adam Burgis, London (GB); Dominic Crosthwaite, London (GB)

(73) Assignee: CANTOR INDEX LLC, New York, NY (US)

( * ) Notice: Subject to any disclaimer, the term of this patent is extended or adjusted under 35 U.S.C. 154(b) by 761 days.

(21) Appl. No.: 11/928,839

(22) Filed: Oct. 30, 2007

(65) Prior Publication Data

US 2008/0058095 A1 Mar. 6, 2008

Related U.S. Application Data

(63) Continuation of application No. 10/453,769, filed on Jun. 3, 2003, now abandoned.

(Continued)

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G06Q 50/34*** | (2012.01) |
| ***G07F 17/32*** | (2006.01) |

(52) U.S. Cl.

CPC ............. *G06Q 50/34* (2013.01); *G07F 17/32* (2013.01); *G07F 17/3288* (2013.01)

(58) Field of Classification Search

CPC ...... G07F 17/3288; G07F 17/32; G06Q 50/34

USPC ......................................... 463/25, 16, 20, 42

See application file for complete search history.

(56) References Cited

U.S. PATENT DOCUMENTS 3,909,002 A 9/1975 Levy
4,874,177 A 10/1989 Girardin ....................... 273/246

(Continued)

FOREIGN PATENT DOCUMENTS

AU 2004297887 6/2005
CA 2478180 3/2003

(Continued)

OTHER PUBLICATIONS

Patent Pending U.S. Appl. No. 10/983,279 entitled *System and Method for Betting on a Subset of Participants in an Event* by Lee M. Amaitis, et al.; 51 total pages, filed Nov. 5, 2004.

(Continued)

*Primary Examiner* — Omkar Deodhar
*Assistant Examiner* — Wei Lee

(57) ABSTRACT

A method of managing bets is provided. The method includes receiving win bets and group bets. Each win bet includes a bet that a participant selected from a set of participants in an event will win the event. Each group bet includes a bet that one of a subset of the set of participants will win the event. Results of the event identifying a winning participant from the set of participants are received. An amount of a win bet payout for at least a portion of the win bets that comprise a bet on the winning participant is determined. An amount of a group bet payout for at least one of the group bets is also determined. In this manner, a bettor may bet on all participants in an event other than a particular participant, such as the favorite participant, and thus effectively bet against the particular participant.

85 Claims, 12 Drawing Sheets

Related U.S. Application Data

(60) Provisional application No. 60/460,595, filed on Apr. 3, 2003.

(56) References Cited

U.S. PATENT DOCUMENTS

| | | | | |
|---|---|---|---|---|
| 4,962,950 | A | 10/1990 | Champion | 283/67 |
| 5,275,400 | A | 1/1994 | Weingardt et al. | |
| 5,374,060 | A | 12/1994 | Goldberg | |
| 5,452,899 | A | 9/1995 | Skratulia et al. | |
| 5,573,244 | A | 11/1996 | Mindes | |
| 5,586,937 | A | 12/1996 | Menashe | 463/41 |
| 5,672,106 | A | 9/1997 | Orford et al. | |
| 5,687,968 | A | 11/1997 | Tarantino | 273/139 |
| 5,713,793 | A | 2/1998 | Holte | 463/25 |
| 5,741,181 | A | 4/1998 | Nakagawa et al. | |
| 5,743,525 | A | 4/1998 | Haddad | 273/139 |
| 5,749,785 | A | 5/1998 | Rossides | 463/25 |
| RE35,864 | E | 7/1998 | Weingardt et al. | |
| 5,830,068 | A | 11/1998 | Brenner et al. | |
| 5,839,726 | A | 11/1998 | Luise | |
| 5,842,921 | A | 12/1998 | Mindes et al. | |
| 5,888,136 | A | 3/1999 | Herbert | 463/22 |
| 5,957,775 | A | 9/1999 | Cherry | 463/16 |
| 5,984,779 | A | 11/1999 | Bridgeman et al. | 463/16 |
| 6,004,211 | A | 12/1999 | Brenner et al. | 463/40 |
| 6,113,492 | A | 9/2000 | Walker et al. | 463/16 |
| 6,120,376 | A | 9/2000 | Cherry | |
| 6,126,543 | A | 10/2000 | Friedman | 463/16 |
| 6,152,822 | A | 11/2000 | Herbert | 463/22 |
| 6,210,275 | B1 | 4/2001 | Olsen | |
| 6,287,199 | B1 | 9/2001 | McKeown et al. | 463/40 |
| 6,296,569 | B1 | 10/2001 | Congello, Jr. | 463/17 |
| 6,309,307 | B1 | 10/2001 | Lrause et al. | |
| 6,325,721 | B1 | 12/2001 | Miyamoto et al. | 463/40 |
| 6,331,148 | B1 | 12/2001 | Krause et al. | 473/274 |
| 6,354,592 | B1 | 3/2002 | Virzi | |
| 6,358,150 | B1 | 3/2002 | Mir et al. | |
| 6,383,074 | B1 | 5/2002 | Boggs | 463/25 |
| 6,450,887 | B1 | 9/2002 | Mir et al. | |
| 6,527,270 | B2 | 3/2003 | Maksymec et al. | 273/138.1 |
| 6,554,708 | B1 | 4/2003 | Brenner et al. | |
| 6,688,978 | B1 | 2/2004 | Herman | |
| 6,695,701 | B2 | 2/2004 | Aronson et al. | 463/28 |
| 6,712,701 | B1 | 3/2004 | Boylan, III et al. | |
| 6,722,980 | B2 | 4/2004 | Stronach | |
| 6,786,824 | B2 | 9/2004 | Cannon | |
| 6,811,483 | B1 | 11/2004 | Webb et al. | |
| 6,837,789 | B2 | 1/2005 | Garahi et al. | |
| 6,837,791 | B1 | 1/2005 | Ramsey et al. | 463/42 |
| 6,926,607 | B2 | 8/2005 | Slomiany et al. | |
| 6,929,550 | B2 | 8/2005 | Hisada | 463/42 |
| 7,147,557 | B1 | 12/2006 | Tracy et al. | |
| 7,201,658 | B2 | 4/2007 | Marshall et al. | 463/25 |
| 7,311,606 | B2 | 12/2007 | Amaitis et al. | 463/25 |
| 7,351,149 | B1 | 4/2008 | Simon et al. | |
| 8,905,832 | B2 | 12/2014 | Miller | |
| 2001/0031656 | A1* | 10/2001 | Marshall et al. | 463/6 |
| 2001/0039209 | A1 | 11/2001 | DeWeese et al. | 463/40 |
| 2001/0041612 | A1 | 11/2001 | Garahi et al. | |
| 2001/0047291 | A1 | 11/2001 | Garahi et al. | 705/10 |
| 2001/0051540 | A1 | 12/2001 | Hindman et al. | 463/25 |
| 2002/0049975 | A1 | 4/2002 | Thomas et al. | 725/60 |
| 2002/0077712 | A1 | 6/2002 | Safaei et al. | |
| 2002/0094853 | A1 | 7/2002 | Hayashi | 463/6 |
| 2002/0115488 | A1 | 8/2002 | Berry et al. | 463/42 |
| 2002/0149152 | A1 | 10/2002 | Taylor et al. | 273/269 |
| 2002/0177483 | A1 | 11/2002 | Cannon | |
| 2003/0054870 | A1 | 3/2003 | Sato et al. | 463/6 |
| 2003/0096646 | A1 | 5/2003 | Zhu | 463/28 |
| 2003/0119582 | A1* | 6/2003 | Ocampo | 463/25 |
| 2003/0125822 | A1 | 7/2003 | LaNeve | |
| 2003/0157976 | A1 | 8/2003 | Simon et al. | |
| 2003/0212623 | A1* | 11/2003 | Aylmer et al. | 705/37 |
| 2004/0004656 | A1 | 1/2004 | Sambongi et al. | 347/171 |
| 2004/0006484 | A1 | 1/2004 | Manis et al. | 704/500 |
| 2004/0039461 | A1 | 2/2004 | Stefani | |
| 2004/0048656 | A1 | 3/2004 | Krynicky | 463/25 |
| 2004/0063484 | A1* | 4/2004 | Dreaper et al. | 463/16 |
| 2004/0104845 | A1 | 6/2004 | McCarthy | 342/463 |
| 2004/0111358 | A1 | 6/2004 | Lange et al. | 705/37 |
| 2004/0192437 | A1 | 9/2004 | Amaitis et al. | |
| 2004/0193469 | A1 | 9/2004 | Amaitis et al. | |
| 2004/0193531 | A1 | 9/2004 | Amaitis et al. | 705/37 |
| 2004/0198483 | A1 | 10/2004 | Amaitis et al. | |
| 2004/0204245 | A1 | 10/2004 | Amaitis et al. | |
| 2004/0229671 | A1 | 11/2004 | Stronach et al. | 463/6 |
| 2004/0235542 | A1 | 11/2004 | Stronach et al. | |
| 2005/0032565 | A1 | 2/2005 | Cheng | |
| 2005/0044575 | A1 | 2/2005 | Kuyl et al. | |
| 2005/0049731 | A1 | 3/2005 | Dell | |
| 2005/0102223 | A1 | 5/2005 | Vlazny et al. | |
| 2005/0107151 | A1 | 5/2005 | Amaitis et al. | |
| 2005/0107153 | A1 | 5/2005 | Jubinville et al. | |
| 2005/0116410 | A1 | 6/2005 | Vlazny et al. | |
| 2005/0148379 | A1 | 7/2005 | Huard et al. | 463/16 |
| 2005/0170886 | A1 | 8/2005 | Miller | |
| 2005/0176495 | A1 | 8/2005 | Stronach | 463/25 |
| 2005/0176496 | A1 | 8/2005 | Stronach | 463/25 |
| 2005/0176499 | A1 | 8/2005 | Stronach | |
| 2005/0181862 | A1 | 8/2005 | Asher et al. | |
| 2005/0181868 | A1 | 8/2005 | Vlazny et al. | 463/28 |
| 2005/0187000 | A1 | 8/2005 | Miller | |
| 2005/0227757 | A1 | 10/2005 | Simon | |
| 2006/0009281 | A1 | 1/2006 | Stronach | 463/28 |
| 2006/0068874 | A1 | 3/2006 | Hornik et al. | 463/16 |
| 2006/0073870 | A1 | 4/2006 | Cannon | |
| 2006/0135252 | A1 | 6/2006 | Amaitis et al. | |
| 2006/0214376 | A1 | 9/2006 | Weller | |
| 2007/0026939 | A1 | 2/2007 | Asher et al. | |
| 2007/0026940 | A1 | 2/2007 | Cannella | |
| 2007/0184890 | A1 | 8/2007 | Ollington | |
| 2008/0113816 | A1 | 5/2008 | Mahaffey et al. | |
| 2008/0248850 | A1 | 10/2008 | Schugar | |
| 2009/0088232 | A1 | 4/2009 | Amaitis et al. | |
| 2010/0331066 | A1 | 12/2010 | Jung et al. | |
| 2012/0034961 | A1 | 2/2012 | Berman et al. | |
| 2014/0141850 | A1 | 5/2014 | Miller | |
| 2014/0235305 | A1 | 8/2014 | Asher et al. | |
| 2015/0248816 | A1 | 9/2015 | Miller | |
| 2015/0279164 | A1 | 10/2015 | Miller | |

FOREIGN PATENT DOCUMENTS

| | | | |
|---|---|---|---|
| CA | 2521159 | 11/2004 | |
| CA | 2547447 | 12/2004 | |
| EP | 0 217 984 A1 | 4/1987 | A63F 3/06 |
| EP | 0 625 760 A1 | 11/1994 | G06F 15/44 |
| EP | 0 848 846 B1 | 12/2000 | G06F 17/32 |
| EP | 1 104 686 A1 | 6/2001 | A63F 3/00 |
| EP | 1 288 820 A2 | 3/2003 | G06F 17/60 |
| EP | 1 319 428 A2 | 6/2003 | A63F 3/00 |
| EP | 1 442 773 A2 | 8/2004 | A63F 13/00 |
| GB | 1 574 447 | 9/1980 | G06F 15/28 |
| GB | 2 180 675 A | 4/1987 | G06F 15/28 |
| GB | 2 299 425 A | 10/1996 | G06F 17/00 |
| GB | 2 356 353 A | 5/2001 | A63F 5/00 |
| GB | 2 377 055 A | 12/2002 | G06F 17/60 |
| GB | 2 380 687 A | 4/2003 | G07F 17/32 |
| GB | 2 384 097 A | 7/2003 | G07F 17/34 |
| GB | 2 387 009 A | 10/2003 | G07F 17/34 |
| GB | 2 388 928 A | 11/2003 | G06F 17/60 |
| GB | 2 400 202 A | 10/2004 | G06F 17/60 |
| JP | H9-511593 | 11/1997 | |
| JP | 10-320483 | 4/1998 | |
| JP | H10-320483 | 12/1998 | |
| JP | H11-184937 | 7/1999 | |
| JP | 2000-003405 | 1/2000 | |
| JP | 2001-202467 | 7/2001 | |
| JP | 2002-117427 | 4/2002 | |
| JP | 2002-177630 | 6/2002 | |
| JP | 2003-530174 | 10/2003 | |
| JP | 2005-513593 | 5/2005 | |
| JP | 2008-525900 | 7/2008 | |
| NZ | 516935 | 8/2003 | G06F 17/60 |

(56) References Cited

FOREIGN PATENT DOCUMENTS

| | | | |
|---|---|---|---|
| WO | WO 95/22883 | 8/1995 | |
| WO | WO 98/04991 A1 | 2/1998 | G06F 19/00 |
| WO | WO 99/01192 A1 | 1/1999 | A63F 9/22 |
| WO | WO 99/30788 | 6/1999 | |
| WO | WO 00/00256 A1 | 1/2000 | A63F 3/06 |
| WO | WO 00/22908 A2 | 4/2000 | |
| WO | WO 00/67215 A1 | 11/2000 | |
| WO | WO 00/79442 A1 | 12/2000 | G06F 17/60 |
| WO | WO 01/64305 A2 | 9/2001 | A63F 9/00 |
| WO | WO 01/65507 A2 | 9/2001 | G07F 17/32 |
| WO | WO 01/65508 A2 | 9/2001 | G07F 17/32 |
| WO | WO 01/68204 A1 | 9/2001 | A63F 3/06 |
| WO | WO 01/73649 A2 | 10/2001 | G06F 17/60 |
| WO | WO 01/77861 | 10/2001 | |
| WO | WO 01/77861 A2 | 10/2001 | G06F 17/00 |
| WO | WO 01/77964 A2 | 10/2001 | G06F 17/60 |
| WO | WO 02/101673 | 12/2002 | |
| WO | WO 03/004115 | 1/2003 | |
| WO | WO 03/022378 A2 | 3/2003 | |
| WO | WO 03/045520 | 6/2003 | |
| WO | WO 03/046852 A2 | 6/2003 | G07F 17/32 |
| WO | WO 2004/003803 A2 | 1/2004 | G06F 17/60 |
| WO | WO 2004/097549 | 11/2004 | |
| WO | WO 2005/019986 | 3/2005 | |
| WO | WO 2005/057339 | 6/2005 | |
| WO | WO 2005/074617 | 8/2005 | |
| WO | WO 2005/082478 | 9/2005 | |
| WO | WO 2005/086924 | 9/2005 | |
| WO | WO 2006/017877 | 2/2006 | |
| WO | WO 2013/116359 | 8/2013 | |

OTHER PUBLICATIONS

Patent Pending U.S. Appl. No. 11/076,561 entitled *System and Method for Betting on a Subset of Participants in an Event According to Multiple Groups* by Lee M. Amaitis, et al.; 63 total pages, filed Mar. 9, 2005.

United States Patent and Trademark Office: Office Action for U.S. Appl. No. 10/453,769, filed Jun. 3, 2003 in the name of Lee M. Amaitis, et al., 20 pages, dated Mar. 14, 2006.

United States Patent and Trademark Office: Office Action for U.S. Appl. No. 10/453,769, filed Jun. 3, 2003 in the name of Lee M. Amaitis, et al., 10 pages, dated Feb. 2, 2007.

United States Patent and Trademark Office: Office Action for U.S. Appl. No. 11/022,394, filed Dec. 22, 2004 in the name of Lee M. Amaitis, et al., 16 pages, dated Mar. 22, 2007.

Anthony LeMaire; *Horse Racing Betting Odds*; http://ezinearticles.com/?Horse-Racing-Betting-Odds&id=125666; 1 page, Retrieved Jan. 4, 2008.

United States Patent and Trademark Office; Office Action for U.S. Appl. No. 10/453,769, filed Jun. 3, 2003 in the name of Lee M. Amaitis; 14 pages, dated Jan. 15, 2008.

Notification of Transmittal of the International Search Report and the Written Opinion of the International Searching Authority for International Application No. PCT/US06/08695; 9 pages, dated Mar. 24, 2008.

United States Patent and Trademark Office; Office Action for U.S. Appl. No. 11/076,561, filed Mar. 9, 2005 in the name of Lee M. Amaitis; 25 pages, dated Mar. 24, 2008.

*Webster's New Twentieth Century Dictionary of the English Language*; Unabridged; Second Edition; 2 pages, 1978.

*Nags Head Software, Horserace*; 3 pages, Mar. 15, 2001.

*Bet with the People Who Know Racing*; Racing Daily Forum; 15 pages, Jul. 24, 2001.

Lance Fortnow, et al.; *Betting Boolean-Style: A Framework for Trading in Securities Based on Logical Formulas*; 12 pages, Jun. 2003.

*Quote of the Day; Bet of the Day*; London Times; 1 page, Jul. 30, 2003.

The Patent Office Search Report for International Application No. GB0320232.2; 6 pages, Dec. 17, 2003.

Examination Report for New Zealand Patent Application No. 530448; 1 page, dated Sep. 17, 2004.

Notification of Transmittal of the International Search Report for International Application No. PCT/US03/26235; 5 pages, dated Apr. 13, 2005.

Report of Interview from The Patent Office for Great Britain Application No. GB0320232.2; 3 pages, Sep. 28, 2005.

DICT.org: The DICT Development Group; "*To back the field*"; http://www.dict.org/bin/Dict?Form=Dict2&Database=*&Query=To+back+the=field; 6 pages, Nov. 24, 2005.

*Chilliman Chili Parlor—Appetizers; The Chili Parlor; Appetizers; A Day at the Races*; http://web.archive.org/web/20010305124432/http://chilliman.com/chiliparlor_appetizers.htm; 10 pages, Nov. 25, 2005.

New Zealand Racing Board: Opposition to New Zealand Patent Application No. 530448 in the Name of Cantor Index LLC; Statement of Case; 12 pages, Nov. 28, 2005.

Letters Patent for New Zealand Patent No. 530448: 1 page, Mar. 16, 2006.

Examination Report from The Patent Office for Great Britain Application No. GB0320232.2; 7 pages, dated May 11, 2006.

Examination Report for New Zealand Patent Application No. 539209; 2 pages, dated May 24, 2006.

Examination Report for New Zealand Patent Application No. 547179; 2 pages, dated May 24, 2006.

Office Action from The Patent Office for Great Britain Application No. GB0320232.2; 3 pages, dated Dec. 6, 2006.

European Search Report for Application No. 03816823.3-1238; 3 pages, dated Apr. 17, 2007.

Notification of Transmittal of the International Search Report and the Written Opinion of the International Searching Authority for International Application No. PCT/US05/47027; 8 pages, dated Apr. 26, 2007.

USPTO Office Action Summary for U.S. Appl. No. 10/453,769, filed Jun. 3, 2003; 14 pages, dated Jul. 17, 2007.

Pending Patent Application entitled *System and Method for Betting on a Subset of Participants in an Event Wherein Betting Parameters May Change Over Time*; by Lee M. Amaitis, et al.; 63 total pages, filed Oct. 30, 2007.

"*NTRA All-Star Jockey Championship Special Wagers*"; 3 pages.

"*Wagering Information; Straight or Basic Wagers*"; Lone Star Park at Grand Prairie: Player's Guide; http://www.lonestarpark.com/bet_info.asp; 3 pages.

"*Wagering Information; Straight or Basic Wagers*"; NTRA.com; http://www.ntra.com/news.asp?type=playthehorses&id=4799; 3 pages.

"*Glossary of Terms*"; NTRA.com; http://www.ntra.com/news.asp?type=playthehorses&id=4797; 3 pages.

"*The Basics of Horseplay*"; NTRA.com; http://www.ntra.com/news.asp?type=playthehorses&id-4795; 2 pages.

European Patent Office Examination Report for Application No. 03 816 823.3-1238; 4 pages, dated Nov. 19, 2007.

Notification of Transmittal of the International Search Report and the Written Option of the International Searching Authority, dated Jul. 28, 2005, International Application No. PCT/US05/06314 (10 pp.).

Scarne, John, "Scarne's New Complete Guide to Gambling" (excerpt); Simon & Schuster, 1974, pp. 38-42.

Notification of Transmittal of the Internal Search Report and the Written Opinion of the International Searching Authority, dated Oct. 12, 2005, Application No. PCT/US05/03315 (10 pp.).

Notification of Transmittal of the Internal Search Report and the Written Opinion of the International Searching Authority, dated Aug. 12, 2005, Application No. PCT/US05/03292 (10 pp.).

Scarne, John, "Scarne's New Complete Guide to Gambling" (excerpt); Simon & Schuster, 1974, pp. 32-55.

USPTO Office Action for U.S. Appl. No. 10/771,221, filed Feb. 3, 2004 in the name of Kenneth L. Miller, dated Aug. 17, 2007 (10 pp.).

(56) References Cited

OTHER PUBLICATIONS

Internet Archive Wayback Machine: "TAB New Zealand's Betting Agency", http://web.archive.org/web/19980623064154/http//www.tab.co.nz/; Jun. 23, 1998 (15 pp.).
Intellectual Property Office of New Zealand Examination Report for Patent Application No. 549700, dated May 23, 2007 (3 pp.).
Intellectual Property Office of New Zealand Examination Report for Patent Application No. 549121, dated May 17, 2007 (2 pp.).
USPTO Office Action for U.S. Appl. No. 10/784,353, dated Jul. 11, 2007 (15 pgs).
Supplementary European Search Report dated Nov. 19, 2007, Application No. EP05712675 (3 pgs).
USPTO Office Action for U.S. Appl. No. 10/771,221, dated Sep. 9, 2005 (9 pgs).
USPTO Office Action for U.S. Appl. No. 10/771,221, dated Mar. 8, 2006 (12 pgs).
USPTO Office Action for U.S. Appl. No. 10/771,221, dated Dec. 27, 2006 (6 pgs).
USPTO Office Action for U.S. Appl. No. 10/771,221, dated Aug. 17, 2007 (7 pgs).
USPTO Office Action for U.S. Appl. No. 10/771,221, dated Nov. 1, 2007 (3 pgs).
USPTO Office Action for U.S. Appl. No. 10/771,221, dated Jan. 28, 2008 (8 pgs).
USPTO Office Action for U.S. Appl. No. 10/771,076, dated Jul. 14, 2005 (9 pgs).
USPTO Office Action for U.S. Appl. No. 10/771,076, dated Feb. 14, 2007 (11 pgs).
USPTO Office Action for U.S. Appl. No. 10/771,076, dated May 10, 2007 (2 pgs).
USPTO Office Action for U.S. Appl. No. 10/771,076, dated Jan. 30, 2008 (11 pgs).
USPTO Office Action for U.S. Appl. No. 10/784,353, dated Jun. 30, 2005 (6 pgs).
USPTO Office Action for U.S. Appl. No. 10/784,353, dated Jan. 10, 2006 (11 pgs).
USPTO Office Action for U.S. Appl. No. 10/784,353, dated Apr. 19, 2006 (3 pgs).
USPTO Office Action for U.S. Appl. No. 10/784,353, dated Jan. 8, 2007 (12 pgs).
Intellectual Property Office of New Zealand Examination Report for Patent Application No. 549116, dated Jul. 31, 2008 (2 pgs.).
USPTO Office Action for U.S. Appl. No. 10/771,076, dated Sep. 3, 2008 (12 pgs).
Internet Archive Wayback Machine: "TAB New Zealand's Betting Agency", <http://web.archive.org/web/20031004035004/http://tab.co.nz/>; Oct. 4, 2003 (1 pg.).
USPTO Office Action for U.S. Appl. No. 10/784,353, dated Sep. 5, 2008 (8 pgs).
Wonderland Greyhound Park, "Wonderland Wagering Guide," retrieved from Internet (Aug. 29, 2008) dated Apr. 3, 2002 and Dec. 11, 2002, from Internet URL <http://web.archive.org/web/20021211160142/http://wonderlandgreyhound.com/wagering.html> (9 pgs).
USPTO Office Action for U.S. Appl. No. 10/784,353, dated Mar. 11, 2008 (10 pgs).
European Patent Office, Office Action for Application No. 05723963.4, dated May 2, 2008 (5 pgs).
European Patent Office, Office Action for Application No. 05712675.7 dated Feb. 21, 2008 (5 pgs).
Intellectual Property Office of New Zealand Examination Report for Patent Application No. 549121, dated Mar. 14, 2008 (2 pp.).
Intellectual Property Office of New Zealand Examination Report for Patent Application No. 549700, dated Mar. 14, 2008 (2 pp.).
U.S. Appl. No. 10/771,221, filed Feb. 3, 2004.
U.S. Appl. No. 10/771,076, filed Feb. 3, 2004.
U.S. Appl. No. 10/784,353, filed Feb. 23, 2004.
U.S. Appl. No. 10/453,769, filed Jun. 6, 2005.
U.S. Appl. No. 11/022,394, filed Dec. 22, 2004.
U.S. Appl. No. 11/190,613, filed Jul. 26, 2005.
United States Patent and Trademark Office; Office Action for U.S. Appl. No. 10/983,279, 16 pages; dated Dec. 24, 2008.
United States Patent and Trademark Office; Office Action for U.S. Appl. No. 11/076,561; 11 pages; dated Dec. 22, 2008.
U.S. PTO Office Action for U.S. Appl. No. 11/190,613; dated Apr. 30, 2008.
PCT Search report and Written Opinion for International Application No. PCT/US06/28140; 8 pages; dated Feb. 20, 2007.
USPTO Office Action for U.S. Appl. No. 10/771,221, dated Nov. 12, 2008 (12 pgs).
Notice of Opposition for New Zealand Patent No. 549121; 5 pages; Dec. 23, 2008.
Amended Notice of Opposition for NZ Patent Application No. 549121; 4 pages; Mar. 3, 2009.
"How to Play"; accessed Mar. 24, 2009 at http://web.archive.org/web/19980623064856/www.tab.co.nz/4_how_to_play/4_f_how_to.html.
"Thoroughbred Times", accessed Mar. 24, 2009 at http://www.thoroughbredtimes.com/national-news/2004/January/15/magna-institutes-pick-five-wager.aspx.
"Majorwager.com" accessed Mar. 24, 2009 at http://www.majorwager.com/forums/race-track/139617-magna-pick-5-fails-make-500k-pool.html.
Los Angeles Times, "Magna 5 might be the Ticket", accessed Mar. 24, 2009 at http://articles.latimes.com/2004/jan/31/sports/sp-insider31.
"Your Multi Tab" Brochure, accessed Mar. 24, 2009 at http:web.archive.org/web/20031219010102/www.tab.co.nz/Multi/tab-multi-brochure.pdf.
U.S. PTO Office Action for U.S. Appl. No. 11/190,613; 8 pages; dated Feb. 3, 2009.
California Regulatory Notice Register, Title 4. California Horse Racing Board, Aug. 29, 2003.
United States Patent and Trademark Office; Notice of Allowance and Fee(s) Due for U.S. Appl. No. 11/022,394, filed Dec. 22, 2004 in the name of Lee M. Amaitis; 7 pages, dated Aug. 10, 2007.
United States Patent and Trademark Office; Office Action for U.S. Appl. No. 10/983,279, filed Nov. 5, 2004 in the name of Lee M. Amaitis; 18 pages, dated Jun. 13, 2008.
Intellectual Property Office of New Zealand; Examination Report for Application No. 539209; 4 pages, dated Jul. 31, 2008.
United States Patent and Trademark Office; Office Action for U.S. Appl. No. 10/453,769, filed Jun. 3, 2003 in the name of Lee M. Amaitis; 10 pages, dated Aug. 8, 2008.
New Zealand Patent Application No. 333267 entitled *Sporting Event Wagering System*; Abandoned by Applicant on Jun. 13, 2000; 2 pages, Filed Dec. 9, 1998.
Intellectual Property Office of New Zealand; Examination Report for Patent Application No. 547179; 4 pages, dated Aug. 28, 2008.
Intellectual Property Office of New Zealand; Examination Report for Patent Application No. 539209; 1 page, dated Sep. 4, 2008.
AU Examiners Report for AU Application No. 2006220536; dated Sep. 29, 2010; 3 pages.
NZ Examination Report for Application No. 556076; dated Dec. 17, 2010 2 pages.
JP Office Action for Application No. 2007-548577 dated Jan. 4, 2011; 6 pages (includes English Translation).
Notice of Acceptance for AU Application No. 2005216980 dated Mar. 16, 2011; 3 pages.
Notice of Acceptance for AU Application No. 2006276086 dated Mar. 31, 2011; 3 pages.
NZ Examination Report for Application No. 592115; dated Apr. 12, 2011; 2 pages.
EP Search Report for Application No. 05855562.4 dated May 24, 2011; 7 pages.
JP Office Action for Application No. 2008-500985 dated Jun. 7, 2011; 12 pages (includes English Translation).
JP Office Action for Application No. 2007-548577 dated Aug. 2, 2011; 8 pages (includes English Translation).
CA Office Action for Application No. 2616157; 4 pages; dated Aug. 29, 2011.
NZ Examination Report for Application No. 594811; dated Aug. 29, 2011; 3 pages.

(56) References Cited

OTHER PUBLICATIONS

NZ Examination Report for Application No. 594872; 2 pages; dated Sep. 1, 2011.
U.S. PTO Office Action for U.S. Appl. No. 11/928,649; dated Sep. 26, 2011; 36 pages.
U.S. PTO Office Action for U.S. Appl. No. 12/776,905; dated Mar. 1, 2012; 10 pages.
EP Extended Search Report for Application No. 06800146.0; Mar. 29, 2012; 6 pages.
Notice of Acceptance for AU Application No. 2005318970; 3 pages; Mar. 27, 2012.
JP Office Action for Application No. 2008-500985 dated Apr. 24, 2012; 6 pages (includes English Translation).
European Decision to Refuse a European Patent Application for Application No. 05712675.7; Dated Sep. 17, 2012 (12 pgs).
AU Examiners Report for AU Application No. 2011203086; dated Mar. 21, 2012; 2 pages.
US Notice of Allowance for U.S. Appl. No. 11/928,649; dated Oct. 3, 2012; 5 pages.
EP Office Action for Application No. 05855562.4 dated Mar. 14, 2012; 5 pages.
NZ Examination Report, dated Oct. 9, 2012 for New Zealand App'l No. 602822; 2 pages.
NZ Notice of Acceptance for Application No. 592115; dated Oct. 9, 2012; 1 page.
CA Office Action, dated Jul. 5, 2012 for Canadian App'l No. 2,599,952; 4 pages.
EP Extended Search Report for Application No. 06737833.1 dated Mar. 29, 2012; 6 pages.
CA Office Action for Application No. 2521159; 2 pages; dated Jun. 27, 2012.
NZ Examination Report for Application No. 592189; dated Oct. 12, 2012 2 pages.
NZ Examination Report and Notice of Acceptance for Application No. 592189; dated Nov. 6, 2012 2 pages.
NZ Examination Report for Application No. 594872; dated Feb. 27, 2013; 2 pages.
NZ Notice of Acceptance for Application No. 594872; dated Mar. 11, 2013; 1 page.
NZ Examination Report for Application No. 607500; dated Feb. 27, 2013; 2 pages.
US Notice of Allowance for U.S. Appl. No. 11/928,649; dated Jan. 11, 2013; 8 pages.
CA Examiners Report for Application No. 2,592,038; dated Feb. 7, 2013; 3 pages.
NZ Notice of Acceptance for Application No. 594811; dated Jan. 28, 2013; 1 page.
NZ Examination Report for Application No. 605849; dated Jan. 18, 2013; 2 pages.
US Office Action for U.S. Appl. No. 12/776,905; dated Jan. 4, 2013; 6 pages.
AU Examination Report for Application No. 2011203580; dated Feb. 19, 2013; 3 pages.
USPTO Notice of Allowance for U.S. Appl. No. 10/983,279; dated Apr. 2, 2013; 12 pages.
EP Communication for EP App. No. 05855532.4; dated Mar. 28, 2013; 7 pages.
JP Office Action for JP App. No. 2012-158666; dated Jul. 9, 2013; 9 pages (w/English translation).
CA Examiners Report for CA App. No. 2,599,952; dated Mar. 28, 2013; 4 pages.
EP Communication for EP App. No. 06737833.1; dated Jun. 4, 2013; 6 pages.
CA Examiners Report for CA App. No. 2,521,159; dated Apr. 3, 2013; 2 pages.
US Decision on Appeal for U.S. Appl. No. 10/771,221; Mar. 29, 2013; 10 pages.
US Office Action for U.S. Appl. No. 10/771,076; dated Apr. 26, 2013; 19 pages.
US Final Office Action for Application No. 12/776,905; dated Apr. 26, 2013; 10 pages.
JP Office Action for JP App. No. 2013-7077; dated Jul. 30, 2013; 8 pages (w/English translation).
AU Patent Examination Report for AU App. No. 2012201633; dated Sep. 25, 2013; 3 pages.
AU Patent Examination Report for AU App. No. 2011205156; dated Oct. 1, 2013; 2 pages.
AU Patent Examination Report for AU App. No. 2012203799; dated Nov. 29, 2013; 4 pages.
US Office Action for U.S. Appl. No. 10/771,076; dated Dec. 2, 2013; 17 pages.
EP Communication Pursuant to Article 94(3) EPC for App. No. 06800146.0; dated Nov. 12, 2013; 5 pages.
CA Examination Report for CA App. No. 2,522,236; dated Feb. 12, 2014; 5 pages.
US Notice of Allowance for U.S. Appl. No. 12/766,905; dated Dec. 13, 2013; 14 pages.
US Notice of Allowance for U.S. Appl. No. 10/771,221; dated Aug. 19, 2013; 11 pages.
U.S. PTO Office Action for U.S. Appl. No. 11/076,561; dated May 15, 2014; 2 pages.
JP Office Action for App. No. 2013-086561; dated Apr. 22, 2014; 6 pages (w/English translation).
AU Examination Report for App. No. 2011211332; dated Mar. 5, 2014; 4 pages.
NZ Examination Report for App. No. 623711; dated Apr. 16, 2014; 2 pages.
European Search Report for Application No. 05712661.7; 3 pages; dated Aug. 11, 2009.
U.S. PTO Office Action for U.S. Appl. No. 10/784,353; 13 pages; dated Jun. 3, 2009.
Invendium Ltd., Online Betting Guide (OLBG) Betting School, 2202-2009, retrieved from Internet www.online-betting-guide.co.uk on May 19, 2009 from URL<http://www.online-betting-guide.co.uk/school/horse_racing_bets.php>.
U.S. PTO Office Action for U.S. Appl. No. 10/453,769; 12 pages; dated Aug. 4, 2009.
Beyer, Andrew, The Winning Horseplayer, 1994, 138-139.
Intellectual Property Office of New Zealand Examination Report for Patent Application No. 565411, dated Oct. 23, 2009 (3 pgs.).
U.S. PTO Office Action for U.S. Appl. No. 11/076,561; 29 pages; dated Oct. 19, 2009.
U.S. PTO Office Action for U.S. Appl. No. 10/453,769; 3 pages; dated Dec. 6, 2009.
CA Examination Report for CA App. No. 2,616,157; dated Jun. 4, 2014; 3 pages.
U.S. PTO Notice of Allowance for U.S. Appl. No. 11/076,561; dated Jul. 10, 2014; 9 pages.
Canadian Examiner's Requisition for App. No. 2,592,038; dated Sep. 30, 2014; 4 pages.
Canadian Examiner's Requisition for App. No. 2,599,952; dated Dec. 8, 2014; 6 pages.
NZ First Examination Report for App. No. 627644; dated Jul. 29, 2014; 2 pages.
Canadian Examiner's Requisition for App. No. 2,521,159; dated Jan. 9, 2015; 5 pages.
NZ First Examination Report for App. No. 629452; dated Aug. 27, 2014; 2 pages.
AU Patent Examination Report No. 1 for App. No. 2013209388; dated Aug. 14, 2014; 2 pages.
Notification of Transmittal of the International Search Report and the Written Opinion of the International Searching Authority for International Application No. PCT/US2013/023880 dated Jun. 17, 2013 (15 pages).
AU Patent Examination Report No. 1 for App. No. 2013231139; dated May 25, 2015; 2 pages.
JP Office Action for App. No. 2013-7077; dated Apr. 7, 2015; 10 pages (w/English translation).
JP Office Action for App. No. 2013-086561; dated Mar. 24, 2015; 8 pages (w/English translation).
CA Examiners Requisition for App. No. 2,522,236; Apr. 7, 2015; 6 pages.

(56) References Cited

OTHER PUBLICATIONS

CA Examiners Requisition for App. No. 2,616,157; dated May 8, 2015; 4 pages.
EP Summons to Attend Oral Proceedings for App. No. 06800146.0; Feb. 17, 2015; 4 pages.
USPTO Office Action for U.S. Appl. No. 10/771,076; dated Dec. 22, 2011; 17 pages.
USPTO Examiner's Answer for U.S. Appl. No. 10/771,221, filed May 11, 2010; 19 pages.
USPTO Advisory Action for U.S. Appl. No. 10/771,221, dated Mar. 9, 2009; 4 pages.
JP Office Action for App. No. 2015-053538 ; dated Mar. 22, 2016; 14 pages (w/English translation).
AU First Examination Report for App. No. 2015203598; dated Jun. 28, 2016; 3 pages.
AU First Examination Report for App. No. 2015218414; dated Sep. 6, 2016; 3 pages.
CA Examiners Report for App. No. 2522236; dated Sep. 20, 2016; 6 pages.
AU First Examination Report for App. No. 2015203414; dated Nov. 3, 2016; 3 pages.
CA Examiners Report for App. No. 2521159; dated Nov. 17, 2016; 6 pages.
JP Notice of Allowance for App. No. 2015-053538 ; dated Nov. 22, 2016; 3 pages.
AU First Examination Report for App. No. 2015264800; dated Nov. 29, 2016; 2 pages.
NZ Notice of Acceptance for App. No. 713379; Mar. 31, 2017; 1 page.
NZ First Examination Report for App. No. 730158; dated Mar. 30, 2017; 2 pages.
CA Examiners Report for App. No. 2592038; dated Dec. 28, 2016; 6 pages.
JP Office Action for App. No. 2013-086561 ; dated Apr. 18, 2017; 8 pages.
AU SecondExamination Report for App. No. 2015210464; dated May 16, 2017; 3 pages.
CA Examiners Report for App. No. 2616157; dated May 19, 2017; 6 pages.
AU Notice of Acceptance for App. No. 2015210464; dated Jun. 1, 2017; 3 pages.
EP Search Report for Application No. 05855562.4 dated Feb. 25, 2016; 4 pages.
Canadian Examiner's Requisition for App. No. 2,599,952; WOCA; dated Nov. 17, 2016; 6 pages.
NZ Examination Report for App. No. 717453; dated Mar. 2, 2016; 1 page.
AU Examination Report for App. No. 2014262267 ; dated Jan. 13, 2016; 2 pages.
CA Examiners Report for App. No. 2616157; dated Jun. 8, 2016; 6 pages.
NZ Examination Report for App. No. 713379; dated Nov. 4, 2015; 2 pages.
AU First Examination Report for App. No. 2015203598; dated Jun. 19, 2017; 3 pages.
AU First Examination Report for App. No. 2016203277; dated Jun. 27, 2017; 3 pages.
NZ Examination Report for App. No. 732480; dated Jul. 4, 2017; 1 page.

* cited by examiner

52

| CURRENT POOL DATA | | |
|---|---|---|
| HORSE | WIN BET STAKES | GROUP BET STAKES |
| 1 | $1,000 | |
| 2 | $2,000 | |
| 3 | $500 | |
| 4 | $14,000 | $2,000 |
| 5 | $1,500 | |
| TOTAL | $19,000 | $2,000 |

*FIG. 2A*

54

| CURRENT ODDS DATA | | | | |
|---|---|---|---|---|
| HORSE | WITHOUT TAKE-OUT | | WITH 15% TAKE-OUT | |
| | WIN BET ODDS | GROUP BET ODDS | WIN BET ODDS | GROUP BET ODDS |
| 1 | 14:1 | | 11.75:1 | |
| 2 | 13:2 | | 5.38:1 | |
| 3 | 29:1 | | 24.5:1 | |
| 4 | 1:2 | 2:1 | 0.28:1 | 1.55:1 |
| 5 | 9:1 | | 7.5:1 | |

*FIG. 2B*

56

| POTENTIAL PAYOUT PER $1 BET | | | | |
|---|---|---|---|---|
| HORSE | WITHOUT TAKE-OUT | | WITH 15% TAKE-OUT | |
| | WIN BETS | GROUP BETS | WIN BETS | GROUP BETS |
| 1 | $15.00 | | $12.75 | |
| 2 | $7.50 | | $6.38 | |
| 3 | $30.00 | | $25.50 | |
| 4 | $1.50 | $3.00 | $1.28 | $2.55 |
| 5 | $10.00 | | $8.50 | |

*FIG. 2C*

*FIG. 3A*

100 AFTER-COMMISSION (AC) GROUP BET POOL = (BEFORE-COMMISSION (BC) GROUP BET POOL) * (1-TAKE-OUT PERCENT)

102 AC WIN BET STAKE ON EACH PARTICIPANT = (BC WIN BET STAKE ON THAT PARTICIPANT) * (1-TAKE-OUT PERCENT)

104 TOTAL AC WIN BET STAKE ON ALL PARTICIPANTS = SUM OF THE AC WIN BET STAKE ON EACH PARTICIPANT

106 AC GROUP PARTICIPANT WIN BET POOL = SUM OF AC WIN BET STAKE ON EACH GROUPED PARTICIPANT

108 TOTAL AC POOL ON ALL PARTICIPANTS = (TOTAL AC WIN BET STAKE ON ALL PARTICIPANTS {*BASED ON EQUATION 104*}) + (AC GROUP BET POOL {*BASED ON EQUATION 100*})

110 AC PORTION OF GROUP BET POOL ALLOCATED TO EACH GROUPED PARTICIPANT = (AC WIN BET STAKE ON THAT GROUPED PARTICIPANT {*BASED ON EQUATION 102*}) / (AC GROUP-PARTICIPANT WIN BET POOL {*BASED ON EQUATION 106*}) * (AC GROUP BET POOL {*BASED ON EQUATION 100*})

112 TOTAL AC STAKE ON EACH PARTICIPANT = (AC WIN BET STAKE ON THAT PARTICIPANT {*BASED ON EQUATION 102*}) + (AC PORTION OF GROUP BET POOL ALLOCATED TO THAT PARTICIPANT {*BASED ON EQUATION 110*}) *NOTE: PORTION OF GROUP BET POOL ALLOCATED TO ANY NON-GROUPED PARTICIPANT = 0

114A TOTAL AC GROUP BET PAYOUT FOR EACH PARTICIPANT = [(TOTAL AC STAKE ON ALL PARTICIPANTS EXCEPT FOR THAT PARTICIPANT {*BASED ON EQUATION 112*}) * (AC PORTION OF GROUP BET POOL ALLOCATED TO THAT PARTICIPANT {*BASED ON EQUATION 110*}) / (TOTAL AC STAKE ON THAT PARTICIPANT {*BASED ON EQUATION 112*})] + (AC PORTION OF GROUP BET POOL ALLOCATED TO THAT PARTICIPANT {*BASED ON EQUATION 110*})

114B TOTAL AC GROUP BET PAYOUT FOR EACH PARTICIPANT = (TOTAL AC POOL ON ALL PARTICIPANTS {*BASED ON EQUATION 108*}) * (AC PORTION OF GROUP BET POOL ALLOCATED TO THAT PARTICIPANT {*BASED ON EQUATION 110*}) / (TOTAL AC STAKE ON THAT PARTICIPANT {*BASED ON EQUATION 112*})

116 TOTAL AC GROUP BET PROFIT FOR EACH PARTICIPANT = (TOTAL AC GROUP BET PAYOUT FOR THAT PARTICIPANT {*BASED ON EQUATION 114A OR 114B*}) - (BC GROUP BET POOL)

118A AC PAYOUT PER GROUP BET UNIT CURRENCY FOR EACH PARTICIPANT = (TOTAL AC GROUP BET PAYOUT FOR THAT PARTICIPANT {*BASED ON EQUATION 114A OR 114B*}) / (BC GROUP BET POOL)

118B AC PAYOUT PER GROUP BET UNIT CURRENCY FOR EACH PARTICIPANT = (TOTAL AC POOL ON ALL PARTICIPANTS {*BASED ON EQUATION 108*}) / (TOTAL AC STAKE ON THAT PARTICIPANT {*BASED ON EQUATION 112*}) * (AC PORTION OF GROUP BET POOL ALLOCATED TO THAT PARTICIPANT {*BASED ON EQUATION 110*}) / (AC GROUP BET POOL)

120A TOTAL AC WIN BET PAYOUT FOR EACH PARTICIPANT = [(TOTAL AC STAKE ON ALL PARTICIPANTS EXCEPT FOR THAT PARTICIPANT {*BASED ON EQUATION 112*}) * (AC WIN BET STAKE ON THAT PARTICIPANT {*BASED ON THE EQUATION 102*})] / (TOTAL AC STAKE ON THAT PARTICIPANT {*BASED ON EQUATION 112*})] + (AC WIN BET STAKE ON THAT PARTICIPANT {*BASED ON EQUATION 102*})

120B TOTAL AC WIN BET PAYOUT FOR EACH PARTICIPANT = (TOTAL AC POOL ON ALL PARTICIPANTS {*BASED ON EQUATION 108*}) * (AC WIN BET STAKE ON THAT PARTICIPANT {*BASED ON EQUATION 102*}) / (TOTAL AC STAKE ON THAT PARTICIPANT {*BASED ON EQUATION 112*})

122 TOTAL AC WIN BET PROFIT FOR EACH PARTICIPANT = (TOTAL AC WIN BET PAYOUT FOR THAT PARTICIPANT {*BASED ON EQUATION 120A OR 120B*}) - (BC WIN BET STAKE ON THAT PARTICIPANT)

124A AC PAYOUT PER WIN BET UNIT CURRENCY FOR EACH PARTICIPANT = (TOTAL AC WIN BET PAYOUT FOR THAT PARTICIPANT {*BASED ON EQUATION 120A OR 120B*}) / (BC WIN BET STAKE ON THAT PARTICIPANT)

124B AC PAYOUT PER WIN BET UNIT CURRENCY FOR EACH PARTICIPANT = (TOTAL AC POOL ON ALL PARTICIPANTS {*BASED ON EQUATION 108*}) / (TOTAL BC STAKE ON THAT PARTICIPANT {*BASED ON EQUATION 138 - SEE FIGURE 3B*})

*FIG. 3B*

130 TOTAL BC WIN BET STAKE ON ALL PARTICIPANTS = SUM OF THE BC WIN BET STAKE ON EACH PARTICIPANT

132 BC GROUP-PARTICIPANT WIN BET POOL = SUM OF BC WIN BET STAKE ON EACH GROUPED PARTICIPANT

134 TOTAL BC POOL ON ALL PARTICIPANTS = (TOTAL BC WIN BET STAKE ON ALL PARTICIPANTS {*BASED ON EQUATION 130*}) + (BC GROUP BET POOL)

136 BC PORTION OF GROUP BET POOL ALLOCATED TO EACH GROUPED PARTICIPANT = (BC WIN BET STAKE ON THAT GROUPED PARTICIPANT) / (BC GROUP-PARTICIPANT WIN BET POOL {*BASED ON EQUATION 132*}) * (BC GROUP BET POOL)

138 TOTAL BC STAKE ON EACH PARTICIPANT = (BC WIN BET STAKE ON THAT PARTICIPANT) + (BC PORTION OF GROUP BET POOL ALLOCATED TO THAT PARTICIPANT {*BASED ON EQUATION 136*}) *NOTE: BC PORTION OF GROUP BET POOL ALLOCATED TO ANY NON-GROUPED PARTICIPANT = 0

140A TOTAL BC GROUP BET PAYOUT FOR EACH PARTICIPANT = [(TOTAL BC STAKE ON ALL PARTICIPANTS EXCEPT FOR THAT PARTICIPANT {*BASED ON EQUATION 138*}) * (BC PORTION OF GROUP BET POOL ALLOCATED TO THAT PARTICIPANT {*BASED ON EQUATION 136*}) / (TOTAL BC STAKE ON THAT PARTICIPANT {*BASED ON EQUATION 138*})] + (BC PORTION OF GROUP BET POOL ALLOCATED TO THAT PARTICIPANT {*BASED ON EQUATION 136*})

140B TOTAL BC GROUP BET PAYOUT FOR EACH PARTICIPANT = (TOTAL BC POOL ON ALL PARTICIPANTS {*BASED ON EQUATION 134*}) * (BC PORTION OF GROUP BET POOL ALLOCATED TO THAT PARTICIPANT {*BASED ON EQUATION 136*}) / (TOTAL BC STAKE ON THAT PARTICIPANT {*BASED ON EQUATION 138*})

142 TOTAL BC GROUP BET PROFIT FOR EACH PARTICIPANT = (TOTAL BC GROUP BET PAYOUT FOR THAT PARTICIPANT {*BASED ON EQUATION 140A OR 140B*}) - (BC GROUP BET POOL)

144A BC PAYOUT PER GROUP BET UNIT CURRENCY FOR EACH PARTICIPANT = (TOTAL BC GROUP BET PAYOUT FOR THAT PARTICIPANT {*BASED ON EQUATION 140A OR 140B*}) / (BC GROUP BET POOL)

144B BC PAYOUT PER GROUP BET UNIT CURRENCY FOR EACH PARTICIPANT = (TOTAL BC POOL ON ALL PARTICIPANTS {*BASED ON EQUATION 134*}) / (TOTAL BC STAKE ON THAT PARTICIPANT {*BASED ON EQUATION 138*}) * (BC PORTION OF GROUP BET POOL ALLOCATED TO THAT PARTICIPANT {*BASED ON EQUATION 136*}) / (BC GROUP BET POOL)

146A TOTAL BC WIN BET PAYOUT FOR EACH PARTICIPANT = [(TOTAL BC STAKE ON ALL PARTICIPANTS EXCEPT FOR THAT PARTICIPANT {*BASED ON EQUATION 138*}) * (BC WIN BET STAKE ON THAT PARTICIPANT) / (TOTAL BC STAKE ON THAT PARTICIPANT {*BASED ON EQUATION 138*})] + (BC WIN BET STAKE ON THAT PARTICIPANT)

146B TOTAL BC WIN BET PAYOUT FOR EACH PARTICIPANT = (TOTAL BC POOL ON ALL PARTICIPANTS {*BASED ON EQUATION 134*}) * (BC WIN BET STAKE ON THAT PARTICIPANT) / (TOTAL BC STAKE ON THAT PARTICIPANT {*BASED ON EQUATION 138*})

148 TOTAL BC WIN BET PROFIT FOR EACH PARTICIPANT = (TOTAL BC WIN BET PAYOUT FOR THAT PARTICIPANT {*BASED ON EQUATION 146A OR 146B*}) - (BC WIN BET STAKE ON THAT PARTICIPANT)

150A BC PAYOUT PER WIN BET UNIT CURRENCY FOR EACH PARTICIPANT = (TOTAL BC WIN BET PAYOUT FOR THAT PARTICIPANT {*BASED ON EQUATION 146A OR 146B*}) / (BC WIN BET STAKE ON THAT PARTICIPANT)

150B BC PAYOUT PER WIN BET UNIT CURRENCY FOR EACH PARTICIPANT = (TOTAL BC POOL ON ALL PARTICIPANTS {*BASED ON EQUATION 134*}) / (TOTAL BC STAKE ON THAT PARTICIPANT {*BASED ON EQUATION 138*})

200A

EXAMPLE IF HORSE #1 WINS

| | TAKE-OUT | TOTAL POOL | TOTAL STAKE ON HORSE #1 | TOTAL WIN BET PAYOUT | PAYOUT PER $1 WIN BET | WIN BET PROFIT | TOTAL GROUP BET PAYOUT | PAYOUT PER $1 GROUP BET | GROUP BET PROFIT |
|---|---|---|---|---|---|---|---|---|---|
| 204A | 15% | $14,000.00 | $1,190.00 | $8,500.00 | $8.50 | $7,500.00 | $3,400.00 | $1.70 | $1,400.00 |
| 206A | NONE | $14,000.00 | $1,400.00 | $10,000.00 | $10.00 | $9,000.00 | $4,000.00 | $2.00 | $2,000.00 |
| | 208A | 210A | 212A | 214A | 216A | 218A | 220A | 222A | 224A |

202

250

| | WITHOUT TAKE-OUT | | | WITH 15% TAKE-OUT | | |
|---|---|---|---|---|---|---|
| HORSE | WIN BET STAKES | ALLOCATED GROUP BET STAKES | GROUP BET POOL | WIN BET STAKES | ALLOCATED GROUP BET STAKES | GROUP BET POOL |
| 1 | $1,000 | $400 | | $850 | $340 | |
| 2 | $2,000 | $800 | | $1,700 | $680 | |
| 3 | $1,000 | $400 | | $850 | $340 | |
| 4 | $7,000 | 260 | $2,000 | $5,950 | | $1,700 (276) |
| 5 | $1,000 | $400 | | $850 | $340 | |
| 256 | $12,000 | $2,000 | 272 | $10,200 | $1,700 | |
| 258 | $5,000 | 262 | 274 | $4,250 | 278 | |
| | 254 | | | 270 | | |

FIG. 4A

200B

EXAMPLE IF HORSE #2 WINS

| TAKE-OUT | TOTAL POOL | TOTAL STAKE ON HORSE #2 | TOTAL WIN BET PAYOUT | PAYOUT PER $1 WIN BET | WIN BET PROFIT | TOTAL GROUP BET PAYOUT | PAYOUT PER $1 GROUP BET | GROUP BET PROFIT |
|---|---|---|---|---|---|---|---|---|
| 15% | $14,000.00 | $2,380.00 | $8,500.00 | $4.25 | $6,500.00 | $3,400.00 | $1.70 | $1,400.00 |
| NONE | $14,000.00 | $2,800.00 | $10,000.00 | $5.00 | $8,000.00 | $4,000.00 | $2.00 | $2,000.00 |

204B

220B

202

| HORSE | WITHOUT TAKE-OUT | | | WITH 15% TAKE-OUT | | |
|---|---|---|---|---|---|---|
| | WIN BET STAKES | ALLOCATED GROUP BET STAKES | GROUP BET POOL | WIN BET STAKES | ALLOCATED GROUP BET STAKES | GROUP BET POOL |
| 1 | $1,000 | $400 | | $850 | $340 | |
| 2 | $2,000 | $800 | | $1,700 | $680 | |
| 3 | $1,000 | $400 | | $850 | $340 | |
| 4 | $7,000 | | $2,000 | $5,950 | | $1,700 |
| 5 | $1,000 | $400 | | $850 | $340 | |
| | **$12,000** | **$2,000** | | **$10,200** | **$1,700** | |
| | $5,000 | | | $4,250 | | |

FIG. 4B

200C

EXAMPLE IF HORSE #3 WINS

| TAKE-OUT | TOTAL POOL | TOTAL STAKE ON HORSE #3 | TOTAL WIN BET PAYOUT | PAYOUT PER $1 WIN BET | WIN BET PROFIT | TOTAL GROUP BET PAYOUT | PAYOUT PER $1 GROUP BET | GROUP BET PROFIT |
|---|---|---|---|---|---|---|---|---|
| 15% | $14,000.00 | $1,190.00 | $8,500.00 | $8.50 | $7,500.00 | $3,400.00 | $1.70 | $1,400.00 |
| NONE | $14,000.00 | $1,400.00 | $10,000.00 | $10.00 | $9,000.00 | $4,000.00 | $2.00 | $2,000.00 |

204C

220C

202

| HORSE | WITHOUT TAKE-OUT | | | WITH 15% TAKE-OUT | | |
|---|---|---|---|---|---|---|
| | WIN BET STAKES | ALLOCATED GROUP BET STAKES | GROUP BET POOL | WIN BET STAKES | ALLOCATED GROUP BET STAKES | GROUP BET POOL |
| 1 | $1,000 | $400 | | $850 | $340 | |
| 2 | $2,000 | $800 | | $1,700 | $680 | |
| 3 | $1,000 | $400 | | $850 | $340 | |
| 4 | $7,000 | | $2,000 | $5,950 | | $1,700 |
| 5 | $1,000 | $400 | | $850 | $340 | |
| | **$12,000** | **$2,000** | | **$10,200** | **$1,700** | |
| | $5,000 | | | $4,250 | | |

*FIG. 4C*

FIG. 4D

200D

EXAMPLE IF HORSE #4 WINS

| TAKE-OUT | TOTAL POOL | TOTAL STAKE ON HORSE #4 | TOTAL WIN BET PAYOUT | PAYOUT PER $1 WIN BET | WIN BET PROFIT | TOTAL GROUP BET PAYOUT | PAYOUT PER $1 GROUP BET | GROUP BET PROFIT |
|---|---|---|---|---|---|---|---|---|
| 15% | $14,000.00 | $5,950.00 | $11,900.00 | $1.70 | $4,900.00 | $0.00 | $0.00 | -$2,000.00 |
| NONE | $14,000.00 | $7,000.00 | $14,000.00 | $2.00 | $7,000.00 | $0.00 | $0.00 | -$2,000.00 |

204D

220D

202

| HORSE | WITHOUT TAKE-OUT | | | WITH 15% TAKE-OUT | | |
|---|---|---|---|---|---|---|
| | WIN BET STAKES | ALLOCATED GROUP BET STAKES | GROUP BET POOL | WIN BET STAKES | ALLOCATED GROUP BET STAKES | GROUP BET POOL |
| 1 | $1,000 | $400 | | $850 | $340 | |
| 2 | $2,000 | $800 | | $1,700 | $680 | |
| 3 | $1,000 | $400 | | $850 | $340 | |
| 4 | $7,000 | | $2,000 | $5,950 | | $1,700 |
| 5 | $1,000 | $400 | | $850 | $340 | |
| | $12,000 | $2,000 | | $10,200 | $1,700 | |
| | $5,000 | | | $4,250 | | |

200E

EXAMPLE IF HORSE #5 WINS

| TAKE-OUT | TOTAL POOL | TOTAL STAKE ON HORSE #5 | TOTAL WIN BET PAYOUT | PAYOUT PER $1 WIN BET | WIN BET PROFIT | TOTAL GROUP BET PAYOUT | PAYOUT PER $1 GROUP BET | GROUP BET PROFIT |
|---|---|---|---|---|---|---|---|---|
| 15% | $14,000.00 | $1,190.00 | $8,500.00 | $8.50 | $7,500.00 | $3,400.00 | $1.70 | $1,400.00 |
| NONE | $14,000.00 | $1,400.00 | $10,000.00 | $10.00 | $9,000.00 | $4,000.00 | $2.00 | $2,000.00 |

204E

220E

202

| HORSE | WITHOUT TAKE-OUT | | | WITH 15% TAKE-OUT | | |
|---|---|---|---|---|---|---|
| | WIN BET STAKES | ALLOCATED GROUP BET STAKES | GROUP BET POOL | WIN BET STAKES | ALLOCATED GROUP BET STAKES | GROUP BET POOL |
| 1 | $1,000 | $400 | | $850 | $340 | |
| 2 | $2,000 | $800 | | $1,700 | $680 | |
| 3 | $1,000 | $400 | | $850 | $340 | |
| 4 | $7,000 | | $2,000 | $5,950 | | $1,700 |
| 5 | $1,000 | $400 | | $850 | $340 | |
| | $12,000 | $2,000 | | $10,200 | $1,700 | |
| | $5,000 | | | $4,250 | | |

FIG. 4E

240

PAYOUTS AND PROFITS FOR EACH HORSE WITH 15% TAKE-OUT RATE

| | WINNING HORSE | TOTAL POOL | TOTAL STAKE ON WINNING HORSE | TOTAL WIN BET PAYOUT | PAYOUT PER $1 WIN BET | WIN BET PROFIT | TOTAL GROUP BET PAYOUT | PAYOUT PER $1 GROUP BET | GROUP BET PROFIT |
|---|---|---|---|---|---|---|---|---|---|
| 204A | 1 | $14,000.00 | $1,190.00 | $8,500.00 | $8.50 | $7,500.00 | $3,400.00 | $1.70 | $1,400.00 |
| 204B | 2 | $14,000.00 | $2,380.00 | $8,500.00 | $4.25 | $6,500.00 | $3,400.00 | $1.70 | $1,400.00 |
| 204C | 3 | $14,000.00 | $1,190.00 | $8,500.00 | $8.50 | $7,500.00 | $3,400.00 | $1.70 | $1,400.00 |
| 204D | 4 | $14,000.00 | $5,950.00 | $11,900.00 | $1.70 | $4,900.00 | $0.00 | $0.00 | -$2,000.00 |
| 204E | 5 | $14,000.00 | $1,190.00 | $8,500.00 | $8.50 | $7,500.00 | $3,400.00 | $1.70 | $1,400.00 |

*FIG. 4F*

BETTING ON A SUBSET OF PARTICIPANTS IN AN EVENT

CROSS REFERENCE TO RELATED APPLICATION

This application is a continuation of U.S. application Ser. No. 10/453,769 filed Jun. 3, 2003, entitled "System and Method for Betting on a Subset of Participants in an Event," which claims priority to U.S. Provisional Application No. 60/460,595 filed Apr. 3, 2003, entitled "System and Method for Betting on a Subset of Participants in an Event."

TECHNICAL FIELD OF THE INVENTION

This invention relates in general to betting on events and, more particularly, to a system and method for betting on a subset of participants in an event.

BACKGROUND OF THE INVENTION

Wagering on sporting events, such as horse races, for example, is a large and growing industry in many parts of the world. Various types of betting products or systems are available for various types of sporting events For example, typical horse racing bets allow bettors to bet on a single horse or on several horses in a particular race or series of races. For instance, a bettor can bet on a particular horse to finish first (win), finish in the top two (place), or finish in the top three (show). A bettor may also make various combination bets with multiple horses, such as an exacta bet (covering the top two horses in order) or a trifecta bet (covering the top three horses in order). In addition, a bettor may bet on a series of races, such as the daily double (winners of two consecutive races), the pick-three (winners of three consecutive races), and the pick-six (winners of six consecutive races), for example.

In a pari-mutuel betting system, all bets regarding a particular event are aggregated, a commission (or "take-out") is taken by the track, and the remainder is distributed among the winning bettors. For example, pari-mutuel betting systems are commonly used in North America (and other various places throughout the world) for betting on horse races.

SUMMARY OF THE INVENTION

According to one embodiment, a method of managing bets is provided. The method includes receiving one or more win bets and one or more group bets. Each win bet includes a bet that a participant selected from a set of participants in an event will win the event. Each group bet includes a bet that one of a subset of the set of participants will win the event, wherein the subset includes a plurality of the set of participants. Results of the event identifying a winning participant from the set of participants are received. An amount of a win bet payout for at least a portion of the win bets that comprise a bet on the winning participant is determined. An amount of a group bet payout for at least one of the group bets is also determined.

According to another embodiment, a system for managing bets is provided. The system includes a memory coupled to a processor. The memory is operable to store one or more win bets and one or more group bets. Each win bet includes a bet that a participant selected from a set of participants in an event will win the event. Each group bet includes a bet that one of a subset of the set of participants will win the event, wherein the subset includes a plurality of the set of participants. The memory is also operable to store results of the event identifying a winning participant from the set of participants. The processor is operable to determine an amount of a win bet payout for at least a portion of the win bets that comprise a bet on the winning participant, and also to determine an amount of a group bet payout for at least one of the group bets.

Various embodiments of the present invention may benefit from numerous advantages. It should be noted that one or more embodiments may benefit from some, none, or all of the advantages discussed below.

One advantage of the invention is that in an event which includes a set of participants, a bettor may bet on a subset of the set of participants, and win the bet if any of the subset of participants wins the event. Thus, for example, a bettor who believes that a particular participant in an event will not win the event, but is unsure of which other participant to bet on, may purchase a group bet which includes a group of participants which excludes the particular participant. For example, a bettor who believes that the favorite in a horse race will not win the race, but is unsure on which other horse to bet, may purchase a group bet which includes every horse in the field except for the favorite.

In this manner, a bettor may bet on all horses other than the favorite (or another particular horse), thus effectively betting against the favorite, without having to place individual bets on each of the non-favorite horses. In some situations, a bettor may make such a group bet on an event when he or she otherwise would not have made a bet on the event, since the bettor need not place individual bets on each of the non-favorite horses. This may increase the total pool of wagers on the event, which may increase profits at least for the one or more entities that collect a percentage of the take-out on such wagers.

Another advantage of the invention is that such group bets may be provided in a pari-mutuel betting system in which all bets regarding a particular event are pooled.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIGS. 2A, 2B and 2C illustrate example types of current odds data which may be determined by a betting system platform and communicated to clients in accordance with an embodiment of the present invention;

FIG. 3A illustrates various equations for calculating the potential payouts and profits for both win bets and group bets, accounting for take-out;

FIG. 3B illustrates various equations for calculating the potential payouts and profits for both win bets and group bets, without accounting for take-out;

FIGS. 4A through 4F are charts illustrating various payouts for win bets and group bets for various results of an example horse race using the equations shown in FIGS. 3A and 3B in accordance with an embodiment of the present invention;

DETAILED DESCRIPTION OF EXAMPLE EMBODIMENTS OF THE INVENTION

Figure 1:
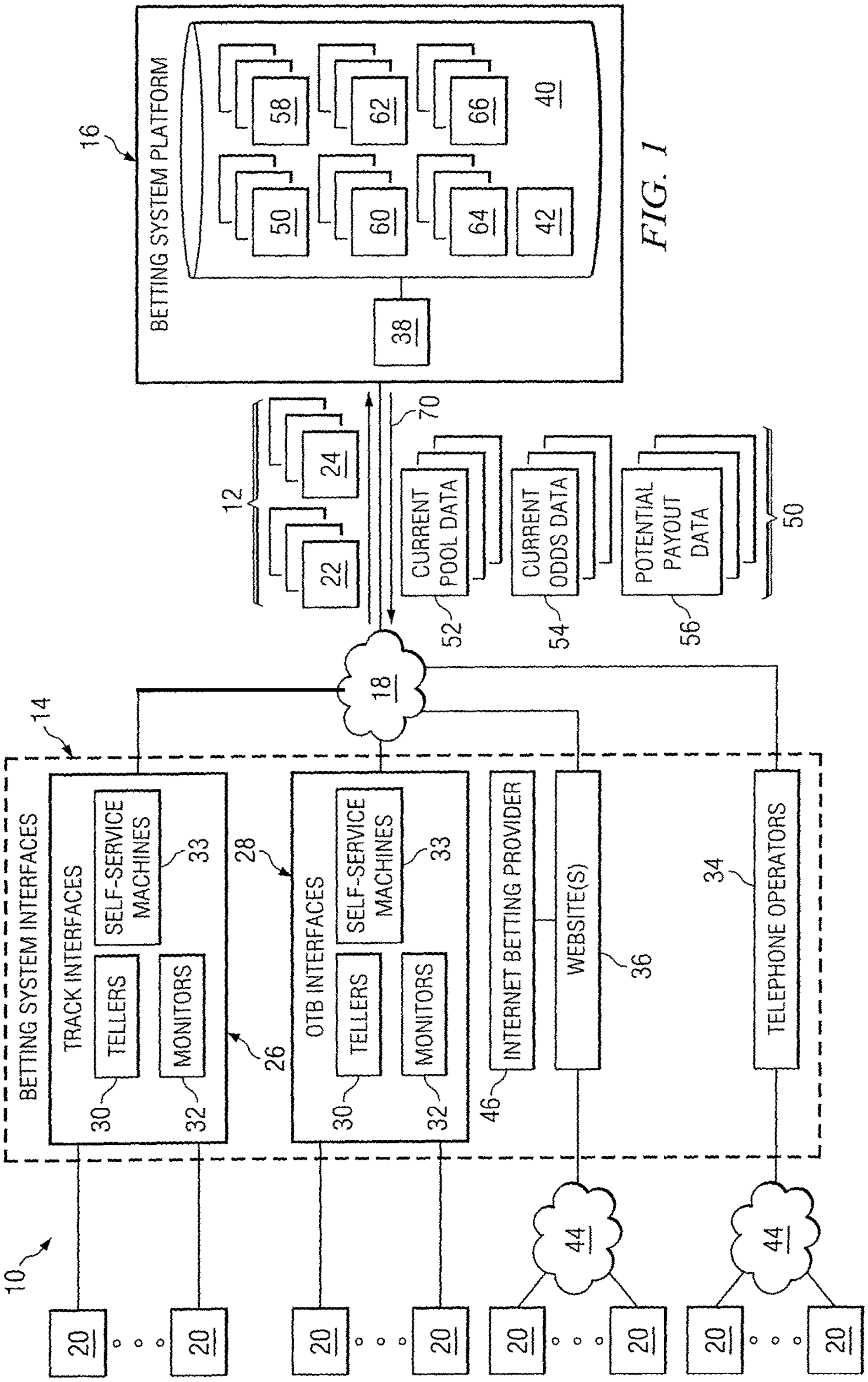
FIG. 1 illustrates a system for receiving and managing win bets and group bets in accordance with an embodiment of the present invention.

FIG. 1 illustrates an example system 10 for receiving and managing bets 12 in accordance with an embodiment of the present invention. System 10 includes one or more betting system interfaces 14 and a betting system platform 16 coupled by one or more communications networks 18. In general, one or more clients 20 may receive betting information (such as event times, betting rules, betting options and odds, for example) and/or place bets 12 via betting system interfaces 14. Betting system interfaces 14 communicate such bets 12 received from clients 20 to betting system platform 16. Betting system platform 16 stores the received bets 12, determines appropriate odds and payouts, and communicates such odds and payouts to one or more of the betting system interfaces 14.

System 10 permits clients 20 to place at least both win bets (or straight wagers) 22, as well as group bets 24 on a betting event having a set of event participants, such as a horse race, dog race, auto race, or golf tournament, for example. A win bet (or straight wager) 22 is a bet that a particular participant will win the event. For example, in a horse race, an example of a win bet 22 is a bet that Horse #3 will win the race. A group bet 24, on the other hand, is a bet that one of a group, or subset, of the set of participants will win the event. In some situations, the subset or group may include all of the participants in an event except for a single participant. In such situations, the group may include all of the participants in an event except for the "favorite," or in other words, the participant having (or predicted to have) the best chance of winning the event. For example, in a 14-horse race in which Horse #3 is the favorite, an example group bet 24 is a bet that any of the horses except for Horse #3 will win the race.

By placing a group bet 24, a client 20 may bet on all participants other than the favorite (or another particular participant), thus effectively betting against the favorite, without having to place individual bets on each of the non-favorite participants. Thus, for example, a bettor who believes that the favorite horse in a horse race a will not win the race, but is unsure on which other horse to bet, may purchase a group bet 24 which includes all horses except the favorite.

In some embodiments, more than one different group bet 24 may be available to clients 20. For example, for a particular ten-horse race, a first group bet 24 may be available which covers Horses #2-#10, thus effectively providing a bet against Horse #1; a second group bet 24 may be available which covers Horses #1 and #3-#10, thus effectively providing a bet against Horse #2; and a third group bet 24 may be available which covers Horses #1-#4 and #6-#10, thus effectively providing a bet against Horse #5.

In alternative embodiments, the group of participants covered by a particular group bet 24 may exclude two, three, or any other number of participants in the event. For example, for the ten-horse race discussed above, a group bet 24 may be available which covers Horses #3-#4 and #6-#10, thus effectively providing a bet against Horses #1, #2 and #5. The number of participants for which a particular group bet 24 may cover may be related to the number of participants in the event. For example, in one embodiment, a group bet 24 in a six-horse race may cover all but one horse (such as the favorite horse), a group bet 24 in a eight-horse race may cover all but two horses (such as the top two favorites), and a group bet 24 in a race of ten or more horses may cover all but three horses (such as the top three favorites).

In some embodiments, system 10 is a pari-mutuel betting system in which all bets 12 (or at least a relevant group of bets 12) regarding a particular event are pooled, a commission (or "take-out") is taken by the track or other wagering provider, and the remainder is distributed among the winning bettors. In other embodiments, system 10 may be another type of betting system, such as a betting system in which clients 20 take positions against a bookmaker, for example.

Group bets 24 may be incorporated into an existing pari-mutuel pool in the following manner. Suppose, for example, a group bet 24 which covers all participants in an event except for the favorite participant. At the close of betting on a particular event, the amount of each individual group bet 24 (less the take-out rate) is divided and allocated among all participants covered by the group bet 24 such that the potential payout (in other words, the payout if the group bet 24 wins) for the group bet 24 is related to the odds on the favorite participant. Generally, the lower the odds on the favorite participant (in other words, the more that has been bet on the favorite), the greater the potential payout for the group bet 24. Thus, a group bet 24 in a race in which the favorite participant has 3-5 odds pays more than a similar group bet 24 in a race in which the favorite participant has 2-1 odds. In one embodiment, the payout for the group bet 24 is equal to the inverse of the odds on the favorite participant. Thus, in this embodiment, if the favorite participant has 2-5 odds, the group bet 24 will payout at a 5-2 rate.

Betting system interfaces 14 may include any suitable interface between a client 20 and betting system platform 16. For example, as shown in FIG. 1, betting system interfaces 14 may include physical interfaces, such as track interfaces 26 and/or off-track interfaces 28. Track interfaces 26 are generally located at a track, while off-track interfaces 28 are generally located at an off-track-betting (OTB) establishment, such as an OTB parlor. Track interfaces 26 and off-track interfaces 28 may include tellers 30, which may receive bets 12 from and distribute payouts to clients 20, and/or monitors 32, which may be viewed by clients 20 to monitor betting information such as the event time, the current odds, and the projected or actual payouts for various bets 12, for example. In some situations, such information may be updated substantially in real time or at preset intervals (such as every 30 seconds, for example) as new bets 12 are placed and/or as information regarding the event changes, for example. Monitors 32 may include, for example, tote-boards or closed-circuit televisions located at a track or OTB establishment.

Track interfaces 26 and/or off-track interfaces 28 may also include one or more self-service betting machines 33. In some embodiment, self-service betting machines 33 allow clients 20 to insert payment into the machine (such as cash or by using a voucher or a credit or debit card), place one or more win bets 22 and/or group bets 24, and receive a printout (such as a ticket, for example) indicating the bet or bets placed. Printouts for winning bets may be inserted into the self-service betting machine, such as to receive a payment voucher (which may be used to receive a payout from a teller 30) or to place additional bets 12. In other embodiments, self-service betting machines 33 allow clients 20 to use a credit or debit card to place bets 12. The credit or debit card may have an associated account, which may be a betting account provided and/or managed by a betting account provider. In some embodiments, after the betting event is completed, a client 20 may insert or swipe his or her credit or debit card in the self-service betting machines 33 in order to update the balance on the card. Self-service betting machines 33 may also allow the client 20 to print out payment vouchers which may be presented to a teller 30 in order to receive payments.

As shown in FIG. 1, betting system interfaces 14 may also include various non-physical interfaces, such as one or more telephone operators 34 and one or more websites 36. Clients 20 may access or communicate with such non-physical interfaces via one or more communications networks 44. Communications networks 44 may include one or more servers, routers, switches, repeaters, backbones, links and/or any other appropriate type of communication devices coupled by links such as wire line, optical, wireless, or other appropriate links. In general, communication network 28 may include any interconnection found on any communication network, such as a telephone network, a local area network (LAN), metropolitan area network (MAN), wide area network (WAN), the Internet, portions of the Internet, or any other data exchange system. To access betting system interface 14 using communication networks 44, clients 20 may use a computer, a personal digital assistant (pda), a cell-phone, a remote paging device, an electronic mail communication device, a handheld betting device, or any other suitable mobile device. In certain embodiments, clients 20 may receive any suitable information, such as betting information, from betting system platform 16 via mobile devices using, for example, communication networks 44 and betting system interfaces 14.

Telephone operators 34 may communicate betting information (such as event times, betting rules, betting options and odds, for example) to, and take bets 12 from, clients 20. Similarly, websites 36 may communicate betting information to clients 20 and allow clients 20 to place bets 12. One or more of such websites 36 may be hosted by one or more servers associated with system 10, which server or servers may also host betting system platform 16 in some embodiments. In some embodiments, betting information available to clients 20 via websites 36 may be updated substantially in real time or at preset intervals (such as every 30 seconds, for example) as new bets 12 are placed and/or as information regarding the event changes, for example.

In some embodiments, one or more websites 36 may be provided by, or associated with, an Internet betting provider 46, for example. Internet betting provider 46 may provide Internet account wagering by providing online betting accounts to one or more clients 20. Using an online betting account, a client 20 may interface with one or more websites 36 associated with the Internet betting provider 46 in order to fund the account, view betting information regarding betting events, and place bets (such as win bets 22 and/or group bets 24). Such online betting accounts may include one or more various types of accounts, such as deposit accounts, credit accounts, stop-loss accounts, and hybrid accounts, for example.

Some or all of the betting system interfaces 14 of system 10 may be operable to offer or receive both win bets 22 and group bets 24. However, in some embodiments, one or more betting system interfaces 14 may only offer or receive either win bets 22 or group bets 24. For example, in a particular embodiment, a website 36 may allow clients 20 to place both win bets 22 and group bets 24, while a particular OTB parlor 28 may only allow clients 20 to place win bets 22.

As discussed above, betting system platform 16 is operable to receive bets 12 (including both win bets 22 and group bets 24) from betting system interfaces 14, store the received bets 12, determine appropriate odds and payouts, and communicate such odds and payouts to one or more of the betting system interfaces 14, which may then display such odds and/or payouts to clients 20. As shown in FIG. 1, betting system platform 16 includes a processor 38 coupled to a memory 40. Processor 38 is generally operable to execute various algorithms or calculations to determine current odds data 50, such as current pool data 52, current odds data 54 and/or potential payout data 56, shown in FIGS. 2A, 2B and 2C, which are discussed below in greater detail.

As discussed above, betting system platform 16 comprises processor 38 and memory 40. Processor 38 may comprise any suitable processor that executes a betting system software application 42 or other computer instructions, such as a central processing unit (CPU) or other microprocessor, and may include any suitable number of processors working together. Memory 40 may comprise one or more memory devices suitable to facilitate execution of the computer instructions, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors.

Memory 40 is generally operable to store various information that may be used by processor 38 in determining odds and/or payouts. For example, memory 40 may comprise any suitable number of databases, which may be co-located or physically and/or geographically distributed. In the example shown in FIG. 1, memory 40 may store any or all of the following: betting system software application 42, current odds data 50, one or more event parameters 58, one or more bet parameters 60, one or more calculation rules 62, one or more event results 64, and one or more bet results 66. Event parameters 58 may comprise various parameters of one or more betting events, such as, for example, the type of event, the time, date and location of the event and/or the number (or in some cases, the name) of each of the participants in the event. Bet parameters 60 may comprise various parameters of one or more received bets 12, such as the identity of the client 20 who placed the bet 12, the manner in which the bet 12 was placed (such as via telephone, the Internet, or in person at a track or OTB establishment, for example), the type of bet 12 (such as whether the bet 12 is a win bet 22 or a group bet 24, for example), the commission rate on the bet 12, the participant or participants covered by the bet 12 and/or the amount of the bet 12, for example. Calculation rules 62 may comprise various equations or other algorithms to be used by processor 38 in determining various current odds data 50. Examples of such equations are illustrated and discussed below with reference to FIGS. 3A and 3B. Event results 64 may comprise various data regarding the results of one or more betting events, such as the final position of each participant in an event, whether there was a tie for any position and/or whether any participants did not finish the event, for example. Bet results 66 may comprise various data regarding the results of various bets 12, such as the identity of the client 20 who placed the bet 12, whether the bet 12 was a winning bet, the determined payout for the bet 12 and/or whether the payout was distributed to the client 20, for example.

As discussed above, one or more communications networks 18 couple and facilitate wireless or wireline communication between one or more betting system interfaces 14 and betting system platform 16. Each communication network 18 may include one or more servers, routers, switches, repeaters, backbones, links and/or any other appropriate type of communication devices coupled by links such as wire line, optical, wireless, or other appropriate links. In general, each communication network 18 may include any interconnection found on any communication network, such as a local area network (LAN), metropolitan area network (MAN), wide area network (WAN), the Internet, portions of the Internet, or any other data exchange system.

As discussed above, processor 38 is operable to execute betting system software application 42 to determine current odds data 50, such as current pool data 52, current odds data 54 and/or potential payout data 56, shown in FIGS. 2A, 2B and 2C. Processor 38 may determine such current odds data 50 based at least on data received from memory 40 and/or one or more betting system interfaces 14. In addition, processor 38 may update such current odds data 50 based on new information being received by betting system platform 16. In some embodiments, processor 38 may update current odds data 50 in real time, substantially in real time, or at preset intervals (such as every 30 seconds, for example).

As shown in FIG. 1, current odds data 50 may be communicated to one or more betting system interfaces 14 via communications network 18, as indicated by arrow 70. Current odds data 50 may then be made available to clients 20, such as via tote boards or monitors 32 located at a track or OTB establishment, for example, or on an appropriate website 36 that may be accessed by clients 20, for example. In this manner, clients 20 may have access to real-time or substantially real-time current odds data 50 regarding various betting events.

FIGS. 2A, 2B and 2C illustrate example types of current odds data 50 for an example horse race in which Horse #4 is the favorite and a group bet 24 is offered which covers Horse #1, Horse #2, Horse #3 and Horse #5 (all horses except Horse #4). FIG. 2A illustrates current pool data 52 reflecting the current total amount, or the current stake, of win bets 22 on each horse and the current total amount, or the current stake, of group bets 24. Thus, FIG. 2A illustrates the total current win bet stake on each horse, as well as the total current group bet stake on the group bet 24.

FIG. 2B illustrates current odds data 54 reflecting the current odds on the win bet 22 for each horse and current odds on the group bet 24, both without and with take-out at a 15% rate. FIG. 2C illustrates potential payout data 56 reflecting the potential payout for each win bet 22 for each horse and the potential payout for the group bet 24 if betting were closed at that point (in other words, if no additional bets were accepted for that betting event). FIG. 2C illustrates the potential payout for each bet both without and take-out at a 15% rate.

As discussed above, processor 38 may calculate various current odds data 50 using various algorithms or equations. FIGS. 3A and 3B illustrate examples of such algorithms or equations in accordance with one embodiment of the present invention. In particular, FIGS. 3A and 3B illustrates various equations for calculating the current potential payout for each bet 12, including both win bets 22 and group bets 24, associated with a particular betting event. The equations shown in FIGS. 3A and 3B are similar; however, the equations shown in FIG. 3A account for take-out, while the equations shown in FIG. 3A do not. The equations shown in FIGS. 3A and 3B are best understood when viewed in conjunction with FIGS. 4A-4F, as discussed below.

As discussed above, FIG. 3A illustrates various equations for calculating the current potential payout for both win bets 22 and group bets 24, accounting for take-out (commission). In particular, FIG. 3A illustrates an after-commission (AC) group bet pool equation 100; a participant's AC win bet stake equation 102; a total AC win bet stake equation 104; an AC group-participant win bet pool equation 106; a total AC pool on all participants equation 108; an AC group bet pool allocation equation 110; a participant's total AC stake equation 112; a pair of alternative total AC group bet payout equations, 114A and 114B; a total AC group bet profit equation 116; a pair of alternative AC payout per group bet unit currency equations, 118A and 118B; a pair of alternative total AC win bet payout equations, 120A and 120B; a total AC win bet profit equation 122; and a pair of alternative AC payout per win bet unit currency equations, 124A and 124B.

The AC group bet pool equation 100 may be used to determine the after-commission group bet pool, which is equal to the before-commission (BC) group bet pool minus the take-out. In some embodiments, the take-out is a percentage of each bet 12, and the total take-out for an event is thus that percentage of the total pool. For example, if the take-out rate is 15%, the take-out on each win bet 22 or group bet 24 is equal to 15% of such win bet 22 or group bet 24, and the total take-out for the event is 15% of the total pool for the event. However, it should be understood that in alternative embodiments, the take-out (commission) may be otherwise calculated. For example, a separate take-out rate may be charged for win bets 22 and group bets 24.

The participant's AC win bet stake equation 102 may be used to determine the total AC win bet stake on each participant in the event. According to equation 102, the AC win bet stake on each participant is equal to the BC win bet stake on that participant minus the take-out.

The total AC win bet stake equation 104 may be used to determine the total AC win bet stake on all participants, which equals the sum of the AC win bet stake on each participant (as determined using equation 102).

The AC group-participant win bet pool equation 106 may be used to determine the total AC stake of win bets 22 on each participant in the group, or subset, of participants covered by the group bet 24. The participants in the group of participants covered by the group bet 24 may be referred to as the "grouped participants." For example, in a 5 horse race in which Horse #4 is the favorite and a group bet covers Horses #1, 2, 3 and 5, the group-participant win bet pool equation 106 may be used to determine the total AC stake of win bets 22 placed on Horses #1, 2, 3 and 5.

The total AC pool on all participants equation 108 may be used to determine the total AC pool, including the total pool of back bets 22 and group bets 24. According to equation 108, the total AC pool is the sum of the total AC win bet stake (as determined by equation 104) and the AC group bet pool (as determined by equation 100).

The AC group bet pool allocation equation 110 may be used to determine the allocation of the AC group bet pool among each of the grouped participants. According to equation 110, the AC group bet pool (as determined using equation 100) is allocated among the grouped participants in direct proportion to the stake of AC win bets 22 placed on each of the grouped participants (as determined using equation 102).

The participant's total AC stake equation 112 may be used to determine the total AC stake on each participant in an event. According to equation 112, the total AC stake on each participant is the sum of the AC win bet stake on that participant (as determined using equation 102) and the portion of the AC group bet pool allocated to that participant (as determined using equation 110).

Each of the alternative total AC group bet payout equations, 114A and 114B, may be used to determine the potential total AC payout for the AC group bet pool if each participant were to win the event. According to equation 114A, the total AC group bet payout for each particular participant is based on the total AC stake on all participants except for the particular participant (as determined using equation 112), the total AC stake on the particular participant (as determined using equation 112), and the portion of the AC group bet pool allocated to the particular participant (as determined using equation 110). According to equation 114B, the total AC group bet payout for each particular participant is based on the total AC pool on all participants (as determined using equation 108), the portion of the AC group bet pool allocated to the particular participant (as determined using equation 110), and the total AC stake on the particular participant (as determined using equation 112).

It should be understood that using the equations shown in FIG. 3A, the AC group bet payout will be the same if any of the subset of participants covered by the group bet 24 wins the event. Thus, by placing a group bet 24, a bettor may effectively bet against a particular participant (the participant excluded from the subset of participants covered by the group bet 24), and be assured of a particular payout if any of the participants covered by the group bet 24 wins the event.

The total AC group bet profit equation 116 may be used to determine the potential total AC profit on the AC group bet pool if each participant were to win the event. According to equation 116, the total AC group bet profit is equal to the total AC group bet payout (as determined using equation 114) minus the total BC group bet pool.

Each of the alternative AC payout per group bet unit currency equations, 118A and 118B, may be used to determine the potential AC payout per unit of currency (such as one dollar, one pound, or other unit of currency) wagered on group bet 24 if the group bet 24 were to win. For example, equations 118A and/or 118B may be used to determine the potential AC payout per dollar wagered on group bet 24.

According to equation 118A, the potential AC payout per unit currency for each group bet 24 is based on the BC group bet pool and the total AC group bet payout (as determined using equation 114). According to equation 118B, the potential AC payout per unit currency for each group bet 24 is based on the total AC pool on all participants (as determined using equation 108), the total AC stake on a particular participant (as determined using equation 112), the portion of the AC group bet pool allocated to the particular participant (as determined using equation 110), and the AC group bet pool (as determined using equation 100).

Each of the alternative total AC win bet payout equations 120 may be used to determine the potential total AC payout for the total AC win bet stake on each particular participant if that participant were to win the event. According to equation 120A, the total AC win bet payout for each particular participant is based on the total AC stake on all participants except for the particular participant (as determined using equation 112), the total AC stake on the particular participant (as determined using equation 112), and the AC win bet stake on the particular participant (as determined using equation 102). According to equation 120B, the total AC win bet payout for each particular participant is based on the total AC pool on all participants (as determined using equation 108), the AC win bet stake on the particular participant (as determined using equation 102), and the total AC stake on the particular participant (as determined using equation 112).

The total AC win bet profit equation 122 may be used to determine the potential total AC profit on the total win bet stake on each particular participant if that participant were to win the event. According to equation 122, the potential AC profit on the total win bet stake on each participant is equal to the potential total AC win bet payout for that participant (as determined using equation 120) minus the total BC win bet stake on that participant.

Each of the alternative AC payout per win bet unit currency equations 124 may be used to determine the potential AC payout per unit of currency (such as one dollar, one pound, or other unit of currency) wagered on each win bet 22 if that win bet 22 were to win. For example, equations 124A and/or 124B may be used to determine the potential payout per dollar wagered on each winning win bet 22.

According to equation 124A, the potential AC payout per unit currency for each win bet 22 on a particular participant is based on the total BC win bet stake for that participant and the potential AC total win bet payout for that participant (as determined using equation 120). According to equation 124B, the potential AC payout per unit currency for each win bet 22 on a particular participant is based on the total AC pool on all participants (as determined using equation 108) and the total BC stake on the particular participant (as determined using equation 138, shown in FIG. 3B).

As discussed above, FIG. 3B illustrates various equations for calculating the current potential payout for both win bets 22 and group bets 24, without accounting for take-out (commission). In particular, equations FIG. 3B illustrates a total BC win bet stake equation 130; a BC group-participant win bet pool equation 132; a total BC pool on all participants 134; a group bet pool allocation equation 136; a participant's total stake equation 138; a pair of alternative total group bet payout equations, 140A and 140B; a total group bet profit equation 142; a pair of alternative payout per group bet unit currency equations, 144A and 144B; a pair of alternative total win bet payout equations, 146A and 146B; a total win bet profit equation 148; and a pair of alternative payout per win bet unit currency equations, 150A and 150B. Equations 130 through 150 are similar to equations 104 through 124, respectively, shown in FIG. 3A, but without accounting for take-out.

FIGS. 4A through 4F may be used to illustrate the calculation of payouts and profits for win bets 22 and group bets 24 for various results of an example horse race using the example equations shown in FIGS. 3A and 3B in accordance with an embodiment of the present invention. In the example shown in FIGS. 4A through 4F, the horse race is a five-horse race, Horse #4 is the favorite, and a group bet 24 is provided which covers Horses #1, 2, 3 and 5 (all horses except Horse #4). It should be understood that the payouts and profits calculated as described above may comprises potential payouts and profits, which may be calculated and/or updated dynamically prior to the race, or actual payouts and profits, which may be calculated after betting on the race has been closed, or after the race has been run and/or declared "official."

Each of FIGS. 4A through 4E illustrates the calculation of the potential payouts and profits for win bets and group bets if a particular horse were to win the race. In particular, FIG. 4A illustrates the calculation of the potential payouts and profits if Horse #1 were to win; FIG. 4B illustrates the calculation of the potential payouts and profits if Horse #2 were to win; FIG. 4C illustrates the calculation of the potential payouts and profits if Horse #3 were to win; FIG. 4D illustrates the calculation of the potential payouts and profits if Horse #4 were to win; and FIG. 4E illustrates the calculation of the potential payouts and profits if Horse #5 were to win. In addition, each of FIGS. 4A through 4E illustrates the calculation of the potential payouts and profits before (or without) accounting for take-out and after (or with) accounting for take-out.

FIG. 4A illustrates a payout table 200A and a stakes table 202. Payout table 200A indicates various payouts and profits assuming Horse #1 were to win. Such payouts and profits are based at least on stakes table 202 and one or more calculations shown in FIGS. 3A and 3B.

Payout table 200A includes various payouts and profits as calculated before-commission (BC), as indicated by row 206A, and after-commission (AC), as indicated by row 204A. A take-out rate of 15% is used in this example. However, it should be understood that any suitable take-out rate may be used. For each case, BC and AC, payout table 200A indicates the take-out rate 208A; the total stake on all horses, 210A; the total stake on Horse #1, 212A; the total win bet payout if Horse #1 were to win, 214A; the payout per win bet unit currency if Horse #1 were to win, 216A; the total win bet profit if Horse #1 were to win, 218A; the total group bet payout if Horse #1 were to win, 220A; the payout per group bet unit currency if Horse #1 were to win, 222A; and the total group bet profit if Horse #1 were to win, 224A.

Stakes table 202 includes a before-commission (BC) section 250 and an after-commission (AC) section 252. BC section 250 indicates example current BC win bet stakes 254 on each horse, a current BC total of win bets on all horses 256, a BC group-participant win bet pool 258, an example current BC group bet pool 260, and the BC allocation of the group bet pool, indicated by reference number 262. AC section 252 indicates example current AC win bet stakes 270 on each horse, a current total of win bets on all horses 272, an AC group-participant win bet pool 274, an example current AC group bet pool 276, and the allocation of the AC group bet pool, indicated by reference number 278.

Various data within BC section 250 and AC section 252 may be determined using one or more calculations shown in FIGS. 3A and 3B. For example, regarding BC section 250, the current BC total of win bets on all horses 256 may be determined using equation 130; the BC group-participant win bet pool 258 may be determined using equation 132; and the BC allocation of the group bet pool, indicated as 262, may be determined using equation 136.

Regarding AC section 252, the current AC win bet stakes 270 on each horse may be determined using equation 102; the current AC total of win bets on all horses 272 may be determined using equation 104; the AC group-participant win bet pool 274 may be determined using equation 106; the current AC group bet pool 276 may be determined using equation 100; and the allocation of the AC group bet pool, indicated as 278, may be determined using equation 110.

In addition, as discussed above, the payouts and profits shown in payout table 200A may be determined based on stakes table 202 using one or more calculations shown in FIGS. 3A and 3B. First, the various payouts and profits calculated with or after take-out, as indicated along row 204A, may be determined using one or more calculations shown in FIG. 3A. For example, the total stake on all horses (before take-out), 210A, may be determined using equation 136. The total AC stake on Horse #1, 212A, may be determined using equation 112, for example. The total AC win bet payout if Horse #1 were to win, 214A, may be determined using either equation 120A or equation 120B, for example. The AC payout per win bet unit currency if Horse #1 were to win, 216A, may be determined using either equation 124A or 124B, for example. In the example shown in FIG. 4A, the AC payout per win bet unit currency is defined as the AC payout per dollar wagered on a win bet on Horse #1. The total AC win bet profit if Horse #1 were to win, 218A, may be determined using equation 122, for example. The total AC group bet payout if Horse #1 were to win, 220A, may be determined using either equation 114A or 114B, for example. The AC payout per group bet unit currency if Horse #1 were to win, 222A, may be determined using either equation 118A or 118B, for example. In the example shown in FIG. 4A, the AC payout per group bet unit currency is defined as the payout per dollar wagered on the group bet 24. Finally, the total AC group bet profit if Horse #1 were to win, 224A, may be determined using equation 116, for example.

Similarly, the various payouts and profits calculated without or before take-out, as indicated along row 206A, may be determined using one or more calculations shown in FIG. 3B. For example, the total BC stake on Horse #1, 212A, may be determined using equation 138. The total win bet payout if Horse #1 were to win, 214A, may be determined using either equation 146A or 146B, for example. The payout per win bet unit currency if Horse #1 were to win, 216A, may be determined using either equation 150A or 150B, for example. In the example shown in FIG. 4A, the payout per win bet unit currency is defined as the payout per dollar wagered on a win bet on Horse #1. The total win bet profit if Horse #1 were to win, 218A, may be determined using equation 148, for example. The total group bet payout if Horse #1 were to win, 220A, may be determined using either equation 140A or 140B, for example. The payout per group bet unit currency if Horse #1 were to win, 222A, may be determined using either equation 144A or 144B, for example. In the example shown in FIG. 4A, the payout per group bet unit currency is defined as the payout per dollar wagered on the group bet 24. Finally, the total group bet profit if Horse #1 were to win, 224A, may be determined using equation 142, for example.

In this manner, the various payouts and profits included in payout table 200A may be determined for situations both with and without take-out. As discussed above, the various payouts and profits included in payout table 200A are relevant in the event that Horse #1 wins the race. FIGS. 4B, 4C, 4D and 4E illustrate payout tables 200B, 200C, 200D and 200E, respectively, which indicate the relevant payouts and profits in the event that Horse #2, Horse #3, Horse #4 or Horse #5, respectively, wins the race.

In view of FIGS. 4A, 4B, 4C and 4E, it can be seen that the potential total group bet payout (indicated as 220A, 220B, 220C and 220E, respectively) is the same ($4,000 without take-out and $3,400 with a 15% take-out rate) if any of the horses covered by the group bet 24 (Horses #1, #2, #3 and #5) win the race. However, as shown in FIG. 4D, it can be seen that the potential total group bet payout 220D if the favorite horse (Horse #4) wins is zero. It should be understood that in some alternative embodiments, the potential total group bet payout may not be different depending on which of the grouped participants wins the event.

FIG. 4F illustrates a payout table 240 which includes the potential after-commission payouts and profits for each of the five horses as determined above with reference to FIGS. 4A through 4E. In other words, table 240 combines the after-commission rows shown in FIGS. 4A through 4E as rows 204A, 204B, 204C, 204D and 204E.

Figure 5:
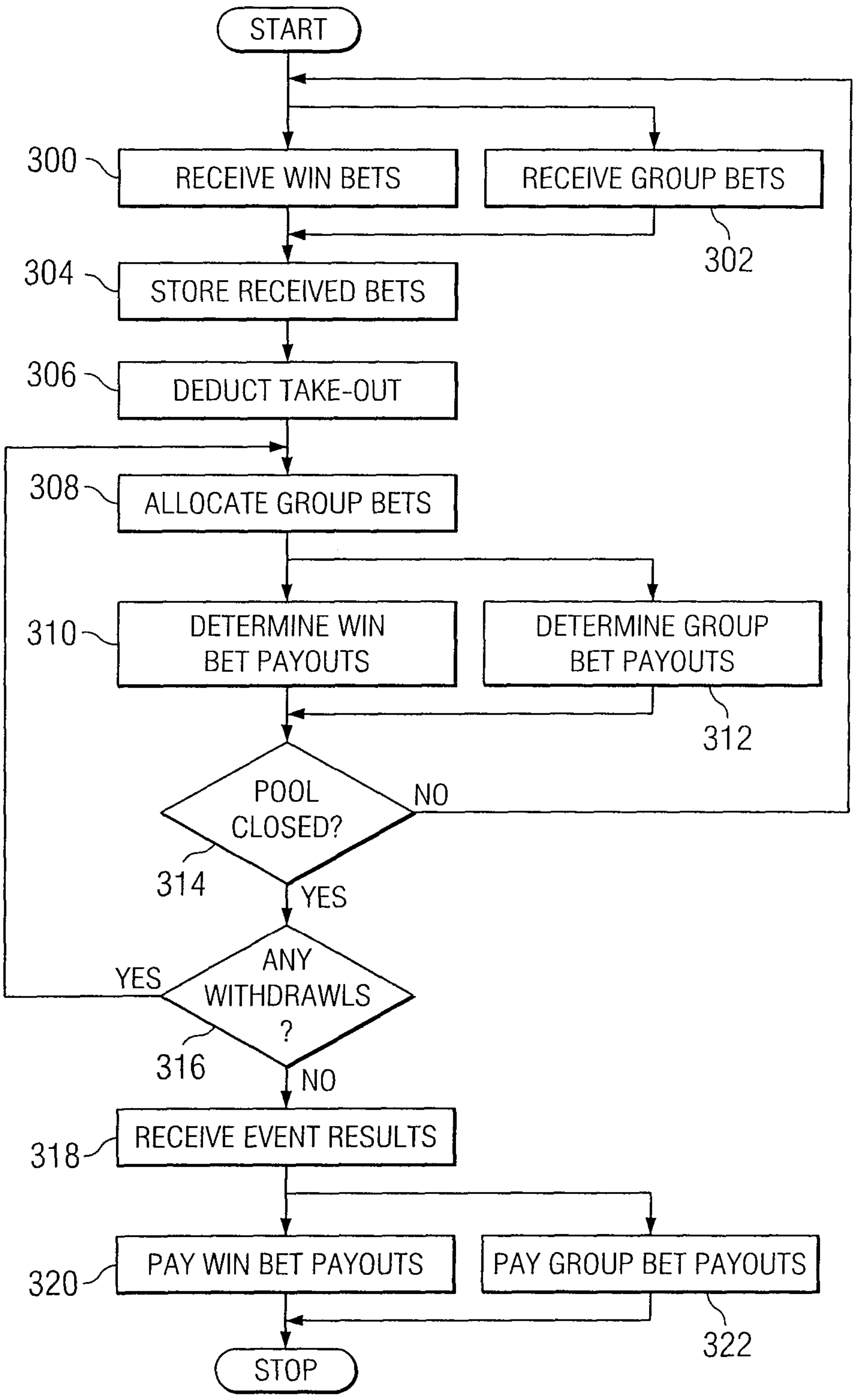
FIG. 5 is a flowchart illustrating an example method of receiving, managing, and paying win bets and group bets in accordance with an embodiment of the present invention.

FIG. 5 is a flowchart illustrating an example method of receiving, managing, and paying win bets 22 and group bets 24 in accordance with an embodiment of the present invention. At step 300, win bets 22 are received from one or more clients 20 via one or more betting system interfaces 14, such as described above with reference to FIG. 1. For example, in the example horse race discussed above with reference to FIGS. 4A through 4F, assume various win bets 22 are received which create the win bet stakes for each horse shown in column 254 of FIG. 4A. At step 302, group bets 24 are received from one or more clients 20 via one or more betting system interfaces 14, such as described above with reference to FIG. 1. For example, in the example discussed above, assume various wagers are received on the group bet 24 covering Horses #1, #2, #3 and #5 which creates a before-commission group bet pool 260 of $2,000 as shown in FIG. 4A. In some situations, steps 300 and 302 may be occur simultaneously, or may at least partially overlap.

Each win bet 22 or group bet 24 received at steps 200 and/or 302 may be stored at step 304, such as within memory 40, for example. A take-out (commission) rate may be applied to each received win bet 22 and group bet 24 at step 306, such as described above with reference to FIG. 4A. For example, regarding win bets 22, a take-out rate of 15% may be applied to received win bets 22 shown in column 254 of FIG. 4A to generate the after-commission win bet stakes for each horse shown in column 270 of FIG. 4A. Similarly, a take-out rate of 15% may be applied to each group bet 24, or to the group bet pool 260, to generate the after-commission group bet pool 276 of $1,700, as shown in FIG. 4A.

At step 308, each received group bet 24 may be divided and allocated among all participants covered by the group bet 24, or all grouped participants, such that the potential payout for the group bet 24 is related to the odds on the favorite participant, such as described above with reference to FIGS. 1 and 4A. For example, the after-commission group bet pool 276 may be divided an allocated as shown in column 278 of FIG. 4A.

At step 310, various odds, payouts and/or profits for some or all received and/or stored win bets 22, such as various current odds 50 or various payouts and profits shown in FIGS. 4A through 4F, for example, may be determined by betting system platform 16. For example, in the example discussed above, various win bet payouts and profits shown in table 200A of FIG. 4A (and similarly for those shown in tables 200B, 200C, 200D and 200E shown in FIGS. 4A, 4B, 4C and 4D, respectively) may be determined at step 310, such as the total win bet payout if Horse #1 were to win, 214A; the payout per win bet unit currency if Horse #1 were to win, 216A; and the total win bet profit if Horse #1 were to win, 218A. Step 310 is described in greater detail with reference to FIG. 6.

At step 312, various odds, payouts and/or profits for some or all received and/or stored group bets 24, such as various current odds 50 or various payouts and profits shown in FIGS. 4A through 4F, for example, may be determined by betting system platform 16. For example, in the example discussed above, various group bet payouts and profits shown in table 200A of FIG. 4A (and similarly for those shown in tables 200B, 200C, 200D and 200E shown in FIGS. 4A, 4B, 4C and 4D, respectively) may be determined at step 312, such as the total group bet payout if Horse #1 were to win, 220A; the payout per group bet unit currency if Horse #1 were to win, 222A; and the total group bet profit if Horse #1 were to win, 224A. Step 312 is described in greater detail with reference to FIG. 7.

At least portions of steps 310 and 312 may be performed simultaneously. In addition, in some embodiments, steps 310 and 312 are performed in real time, substantially in real time, or at preset intervals (such as every 30 seconds, for example) as win bets 22 and/or group bets 24 are received by betting system platform 16.

At step 314, it is determined whether the betting pool is closed. In some embodiments, the betting pool, which includes all bets on the event to be considered in the final determination of payouts, may be closed substantially at the time of or after betting is closed on the event. For example, in some embodiments, bets which are made prior to the close of betting but are processed (at least partially) after the close of betting (such as due to processing and transmission delays, for example) may be included within the betting pool.

If the betting pool is still open, the method may return to steps 300 through 312 to receive and store additional win bets 22 and/or group bets 24, and to recalculate the current odds, payouts and/or profits. In this manner, betting system platform 16 may update the current odds, payouts and/or profits associated with the various bets 12 associated with the event. In some embodiments, betting system platform 16 may perform such updates continuously and/or in real time, substantially in real time, or at preset intervals (such as every 30 seconds, for example).

Thus, it should be understood that each time the method returns to steps 300 through 312 while the betting pool remains open, the allocation of the group bet pool is recalculated at step 308 for newly received win bets 22 and/or group bets 24. In this manner, the allocation of the group bet pool may be continuously (or at preset intervals) updated in order to provide the appropriate win bet and group bet payouts (which are determined at steps 310 and 312, respectively.)

If it is determined at step 314 that the betting pool is closed, the method proceeds to step 316. At step 316, it is determined whether any of the participants in the event will not be competing in the event, such as if a participant is scratched, withdrawn, or becomes a non-runner, for example. For example, betting system platform 16 may receive a notification that one or more of the participants has been withdrawn from the event prior to the start of the event. If it is determined at step 316 that one or more participants will not be competing in the event, the method may return to step 308 to recalculate the allocation of the group bet pool based on the updated set of participants in the event. Otherwise, the method may proceed to step 318. In an alternative embodiment, if it is determined at step 316 that one or more participants will not be competing in the event, all group bets 24 may be cancelled, and refunds may be issued for such group bets 24. It should be understood that step 318 may be performed before, after, or both before and after step 314.

At step 318, the results of the event are received, such as the final position of each participant in the event and whether there was a tie for any position, for example. At step 320, win bet payouts may be distributed to clients 20 who made win bets 22 on the winning participant. For example, assuming in the example discussed above that Horse #1 won the race, win bet payouts may be distributed to clients 20 who made win bets 22 on Horse #1, which payouts may be based on payouts determined at step 310, such as payout per win bet unit currency if Horse #1 were to win, 216A, for example. In some embodiments, win bet payouts may be distributed according to the final determination of win bet payouts made at step 310. In alternative embodiments, win bet payouts may be distributed according to a final determination of win bet payouts made after the betting closed or even after the event was completed.

At step 322, group bet payouts may be distributed to clients 20 who made winning group bets 24. For example, assuming in the example discussed above that Horse #1 won the race, the group bet 24 is a winning bet, and thus group bet payouts may be distributed to all clients 20 who wagered on the group bet 24. Such group bet payouts may be based on payouts determined at step 312, such as payout per group bet unit currency if Horse #1 were to win, 222A, for example. In some embodiments, group bet payouts may be distributed according to the final determination of group bet payouts made at step 312. In alternative embodiments, group bet payouts may be distributed according to a final determination of group bet payouts made after the betting closed or even after the event was completed. In some situations, steps 320 and 322 may be occur simultaneously, or may at least partially overlap.

Figure 6:
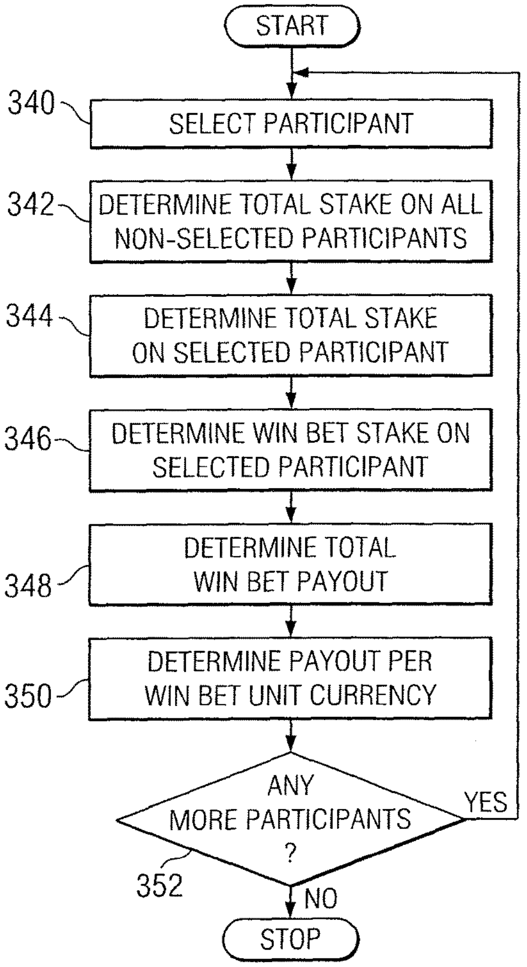
FIG. 6 is a flowchart illustrating an example method of determining various odds, payouts and/or profits for win bets in accordance with an embodiment of the present invention.

FIG. 6 is a flowchart illustrating an example method of determining various odds, payouts and/or profits for win bets 22, such as described above with reference to step 314 shown in FIG. 5. This method may be used to determining various odds, payouts and/or profits for win bets 22 associated with each participant in an event. For example, in the example discussed above, the method may be used to determine the payouts for win bets 22 made on each of the five horses. At step 340, a participant in the set of participants in the event is selected. For example, in the example discussed above, Horse #1 may be selected first, and steps 342 through 350 may then be performed to determine the total win bet payout for win bets 22 made on Horse #1.

At step 342, the total after-commission (AC) stake on all non-selected participants is determined. For example, equation 112 shown in FIG. 3B may be used to determine the total stake of each non-selected participant, and the total stake of each non-selected participant may be added together. In the example discussed above, the total after-commission (AC) stake on all non-selected participants is the total AC stake on Horses #2, 3, 4 and 5, which equals $10,710, as determined by adding the win bet and group bet stakes for Horses #2, 3, 4 and 5, as shown in columns 270 and 278 of table 202 shown in FIG. 4A.

At step 344, the total AC stake on the selected participant is determined, such as using equation 112 shown in FIG. 3B. In the example discussed above, the total AC stake on Horse #1 is $1,190, as shown in column 212A of table 200A shown in FIG. 4A. The total AC win bet stake on the selected participant is determined at step 346. In the example discussed above, the total AC win bet stake on Horse #1 is $850, as shown in column 270 of table 202 shown in FIG. 4A.

At step 348, the total AC win bet payout for the selected participant is determined, such as using either equation 120A or 120B shown in FIG. 3B. In the example discussed above, the total AC win bet payout for Horse #1 is $8,500, as shown in column 214A of table 200A shown in FIG. 4A.

At step 350, the AC payout per win bet unit currency for the selected participant is determined, such as using either equation 124A or 124B shown in FIG. 3B. This may comprise, for example, determining the payout per one dollar wagered on a win bet on the selected participant.

At step 352, it is determined whether there are any more participants in the set of participants in the event. If so, the method returns to repeat steps 340 through 350 for each remaining participant. If not, the method ends. For example, in the example discussed above, 340 through 350 are repeated for Horses #2, 3, 4 and 5 to determine the payouts for win bets 22 made on each of the Horses #2, 3, 4 and 5.

Figure 7:
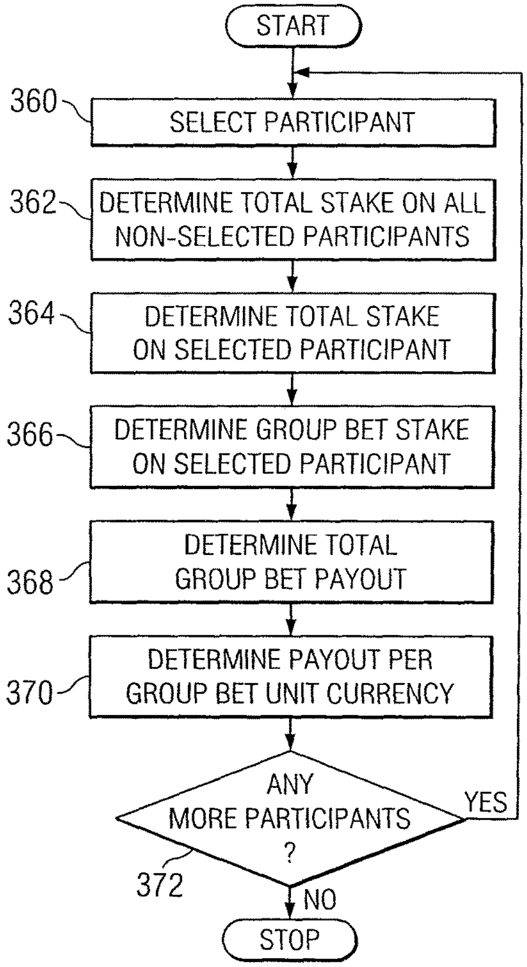
FIG. 7 is a flowchart illustrating an example method of determining various odds, payouts and/or profits for group bets in accordance with an embodiment of the present invention.

FIG. 7 is a flowchart illustrating an example method of determining various odds, payouts and/or profits for group bets 24, such as described above with reference to step 318 shown in FIG. 5. For example, in the example discussed above, the method may be used to determine the payouts for group bets 24. At step 360, a participant in the set of participants in the event is selected. Steps 362 through 370 are then performed, as discussed below, to determine the group bet payout if the selected participant were to win the event. For example, in the example discussed above, Horse #1 may be selected first at step 360 to determine (at steps 362 to 370) the group bet payout if Horse #1 were to win the race.

At step 362, the total after-commission (AC) stake on all non-selected participants is determined. For example, equation 112 shown in FIG. 3B may be used to determine the total stake of each non-selected participant, and the total stake of each non-selected participant may be added together. In the example discussed above, the total after-commission (AC) stake on all non-selected participants is the total AC stake on Horses #2, 3, 4 and 5, which equals $10,710, as determined by adding the win bet and group bet stakes for Horses #2, 3, 4 and 5, as shown in columns 270 and 278 of table 202 shown in FIG. 4A.

At step 364, the total AC stake on the selected participant is determined, such as using equation 112 shown in FIG. 3B. In the example discussed above, the total AC stake on Horse #1 is $1,190, as shown in column 212A of table 200A shown in FIG. 4A. The AC portion of the group bet allocated to the selected participant (such as at step 312 shown in FIG. 5) is determined at step 366. In the example discussed above, the AC portion of the group bet allocated to Horse #1 is $340, as shown in column 278 of table 202 shown in FIG. 4A.

At step 368, the total AC group bet payout if the selected participant were to win the event is determined, such as using either equation 114A or 114B shown in FIG. 3B. In the example discussed above, the total AC group bet payout if Horse #1 were to win the race is $3,400, as shown in column 220A of table 200A shown in FIG. 4A.

At step 370, the AC payout per group bet unit currency for the selected participant is determined, such as using either equation 118A or 118B shown in FIG. 3B. This may comprise, for example, determining the payout per one dollar wagered on the group bet 24.

At step 372, it is determined whether there are any more participants in the set of participants in the event. If so, the method returns to repeat steps 360 through 370 for each remaining participant. If not, the method ends. For example, in the example discussed above, 360 through 370 are repeated for Horses #2, 3, 4 and 5 to determine the payouts for group bets 24 if each of the Horses #2, 3, 4 and 5 were to win the race.

It should be understood that in various embodiments, the steps of the methods shown in FIGS. 5, 6 and 7 may be performed in any suitable order and may overlap in whole or in part without departing from the scope of the present invention. In addition, various steps and methods shown in FIGS. 5, 6 and 7 may be performed in serial or parallel, notwithstanding the example representations shown in FIGS. 5, 6 and 7. For example, as discussed above, in some embodiments, steps 310 and 312 shown in FIG. 5 may be performed after step 314. As another example, steps 320 and 322 shown in FIG. 5 may be performed in series or in parallel without departing from the scope of the invention.

Although embodiments of the invention and their advantages are described in detail, a person skilled in the art could make various alterations, additions, and omissions without departing from the spirit and scope of the present invention as defined by the appended claims.

What is claimed is:

1. A computer implemented method of managing bets, the method comprising:

receiving, at a computer of a betting computer system platform, via a computer network, from betting computer system interfaces, data representing one or more group bets, each group bet designating a corresponding subset of the set of participants in the event, the subset including a plurality of participants but less than all participants in the event, and being a bet that pays if any one of the corresponding designated subset wins the event, the pay amount being substantially the same whichever participant of the designated subset is the winner and independent of finishes other than the winner;

receiving, at the computer of the betting computer system platform, via a payment acceptor, payment associated with one or more bets;

receiving, at the computer of the betting computer system platform, via the computer network, from the betting computer system interfaces, data representing results of the event identifying a winning participant from the set of participants; and determining, by the computer of the betting computer system platform, data representing an amount of a group bet payout for at least one of the group bets based on the group bets designated subsets of which the winning participant is a member.

2. The method of claim 1, wherein the at least one group bet is received in a pari-mutuel betting system, wherein the act of receiving one or more group bets comprises receiving a first group bet made by a bettor, and wherein the act of receiving the first group bet comprises receiving from the bettor a single amount representing an amount at risk in the first group bet.

3. The method of claim 1, wherein two or more of the group bets designate the same subset of participants.

4. The method of claim 1, further comprising:

receiving one or more win bets, each win bet comprising a bet that a participant selected from the set of participants will win the event; and determining the win bets that comprise a bet on the winning participant.

5. The method of claim 4, wherein the amount of the group bet payout is determined based at least in part on the total amount of the win bets that comprise a bet on the winning participant.

6. The method of claim 4, further comprising the steps of:

determining the odds of winning for a one of the participants that is not included in a one of the designated subsets of participants based at least in part on the one or more received win bets; and wherein the amount of the group bet payout for the group bet covering the one designated subset is determined based at least in part on the odds of winning for the one participant.

7. The method of claim 4, wherein determining the amount of the group bet payout comprises:

selecting a participant from the subset of participants; and determining the total amount of the win bets that comprise a bet on any participant in the set of participants except for the selected participant.

8. The method of claim 1, further comprising:

receiving a notification that one or more of the participants will not compete in the event at the computer system; and in response, canceling at least a portion of the group bets that designated the non-competing participant in the respective designated subsets.

9. The method of claim 8, further comprising the step of:

reallocating the amount of at least one of the cancelled group bets among the remaining participants in the designated subset of participants.

10. The method of claim 9, wherein determining the amount of the group bet payout comprises allocating to each of the competing participants in the designated subset a portion of the amount of the group bet.

11. The method of claim 10, wherein determining the amount of the group bet payout further comprises:

determining as a first amount the portion of the group bet allocated to the winning participant;

determining as a second amount the total portion of the group bet allocated among the participants in the set of participants except for the winning participant;

determining as a third amount the total amount of the win bets that comprise a bet on any of the participants in the set of participants except for the winning participant;

determining as a fourth amount the total amount of the win bets that comprise a bet on the winning participant; and determining the amount of the group bet payout based at least on the first amount, the second amount, the third amount, and the fourth amount.

12. The method of claim 11, wherein determining the amount of the group bet payout comprises:

determining a fifth amount by multiplying the sum of the second amount and the third amount by the first amount;

determining a sixth amount by dividing the fifth amount by the sum of the first amount and fourth amount; and adding the sixth amount and the first amount.

13. The method of claim 10, further comprising determining, for each participant in the set of participants, the total amount of the win bets that comprise a bet on that participant; and wherein the amount of the group bet is allocated to each participant in the subset of participants in inverse proportion to the determined total amounts of the win bets associated with that participant.

14. The method of claim 10, wherein determining an amount of a win bet payout for at least a portion of the win bets that comprise a bet on the winning participant comprises:

determining as a first amount the total amount of the win bets that comprise a bet on the winning participant;

determining as a second amount the total portion of the group bet allocated among the participants in the set of participants except for the winning participant;

determining as a third amount the total amount of the win bets that comprise a bet on any of the participants in the set of participants except for the winning participant;

determining as a fourth amount the total portion of the group bet allocated to the winning participant; and determining the amount of the payout for at least a portion of the win bets that comprise a bet on the winning participant based at least on the first amount, the second amount, the third amount, and the fourth amount.

15. The method of claim 14, wherein determining the amount of the payout for at least a portion of the win bets that comprise a bet on the winning participant comprises:

determining a fifth amount by multiplying the sum of the second amount and the third amount by the first amount;

determining a sixth amount by dividing the fifth amount by the sum of the first amount and fourth amount; and adding the sixth amount and the first amount.

16. The method of claim 1 wherein:

a first subset designated in a first of the group bets and a second subset of participants designated in a second of the group bets intersect, but each of the first and second subsets includes participants not in the other of the second and first subsets.

17. The method of claim 1, wherein at least one of the designated subsets designates all but one of the participants.

18. The method of claim 1, wherein at least one of the group bets designates four or more participants.

19. A computer implemented method of managing bets, the method comprising:

receiving, at a computer of a betting computer system platform, via a computer network, from betting computer system interfaces, data representing one or more group bets, each group bet designating a corresponding subset of the set of participants in the event, and being a bet that pays if any one of the corresponding designated subset wins the event, at least one of the group bets designating four or more participants;

receiving, at the computer of the betting computer system platform, via a payment acceptor, payment associated with one or more bets;

receiving, at the computer of the betting computer system platform, via the computer network, from betting computer system interfaces, data representing results of the event identifying a winning participant from the set of participants;

determining, by the computer of the betting computer system platform, data representing an amount of a group bet payout for at least one of the group bets based on the group bets designated subsets of which the winning participant is a member.

20. The method of claim 19, wherein at least one group bet is received in a pari-mutuel betting system, wherein the act of receiving one or more group bets comprises receiving a first group bet made by a bettor, and wherein the act of receiving the first group bet comprises receiving from the bettor a single amount representing an amount at risk in the first group bet.

21. The method of claim 19, further comprising applying a commission rate to at least one of the group bets.

22. The method of claim 19, wherein at least one group bet designates a subset including all but one of the participants in the event.

23. The method of claim 19, wherein:

the amount of the payouts determined for the group bets is substantially the same regardless of which particular participant in the subset designated for corresponding group bets is the winning participant.

24. The method of claim 19, further comprising:

receiving one or more win bets, each win bet comprising a bet that a participant selected from a set of participants in an event will win the event; and determining an amount of a win bet payout for at least a portion of the win bets that comprise a bet on the winning participant.

25. The method of claim 24:

wherein, for at least one of the group bets, a participant in the group bet's designated set of participants is not included in the subset of participants:

the method further comprising the step of determining the odds payout for the group bet based at least in part on the one or more received win bets, and at least in part on the win odds for the excluded particular participant.

26. The method of claim 24, wherein determining the amount of the group bet payout comprises allocating to each participant of the corresponding designated subset of participants a portion of the amount of the group bet.

27. The method of claim 26, further comprising:

after receiving a notification that one or more of the participants in the first subset of participants will not compete in the event, determining the amount of the group bet payout based on reallocating the amount of the group bet among the remaining participants in the subset of participants.

28. The method of claim 26, further comprising:

wherein the amount of the group bet is allocated to each participant in the group bet's corresponding designated subset in inverse proportion to the determined total amounts of win bets on that participant.

29. A non-transitory computer-readable tangible memory, having embodied thereon programs to cause a computer to:

receive, at a computer of a betting computer system platform, via a computer network, from betting computer system interfaces, data representing one or more group bets, each group bet designating a corresponding subset of the set of participants in the event, the subset including a plurality of participants but less than all participants in the event, and being a bet that pays if any one of the corresponding designated subset wins the event, the pay amount being the substantially the same whichever participant of the designated subset is the winner and independent of finishes other than the winner;

receiving, at the computer of the betting computer system platform, via a payment acceptor, payment associated with one or more bets;

receive, at the computer of the betting computer system platform, via the computer network, from betting computer system interfaces, data representing results of the event identifying a winning participant from the set of participants;

determine, by the computer of the betting computer system platform, data representing an amount of a group bet payout for at least one of the group bets based on the group bets designated subsets of which the winning participant is a member.

30. The non-transitory computer-readable tangible memory of claim 29, the programs being designed to further cause the computer to:

receive one or more win bets, each win bet comprising a bet that a participant selected from the set of participants will win the event; and determine the win bets that comprise a bet on the winning participant.

31. The non-transitory computer-readable tangible memory of claim 30, wherein the amount of the group bet payout is determined based at least in part on the total amount of the win bets that comprise a bet on the winning participant, wherein the act of receiving one or more group bets comprises receiving a first group bet made by a bettor, and wherein the act of receiving the first group bet comprises receiving from the bettor a single amount representing an amount at risk in the first group bet.

32. The non-transitory computer-readable tangible memory of claim 30, the programs being designed to further cause the computer to:

determine a payout amount for at least one of the group bets based at least in part on win payout odds for a participant excluded from the subset corresponding to the one group bet.

33. The non-transitory computer-readable tangible memory of claim 29, the programs being designed to further cause the computer to:

allocate the amounts of the group bets to the corresponding designated participants, and determining the payout on the group bet based on the payout calculation used for win bets on the participants.

34. The non-transitory computer-readable tangible memory of claim 29, wherein at least one of the designated subsets designates all but one of the participants.

35. The non-transitory computer-readable tangible memory of claim 29, wherein at least one of the group bets designates four or more participants.

36. A non-transitory computer-readable tangible memory, having embodied thereon programs to cause a computer to:

receive, at a computer of a betting computer system platform, via a computer network, from betting computer system interfaces, data representing one or more group bets, each group bet designating a corresponding subset of the set of participants in the event, and being a bet that pays if any one of the corresponding designated subset wins the event, at least one of the group bets designating four or more participants;

receiving, at the computer of the betting computer system platform, via a payment acceptor, payment associated with one or more bets;

receives at the computer of the betting computer system platform, via the computer network, from betting computer system interfaces, data representing results of the event identifying a winning participant from the set of participants;

determines by the computer of the betting computer system platform, data representing an amount of a group bet payout for at least one of the group bets based on the group bets designated subsets of which the winning participant is a member.

37. The non-transitory computer-readable tangible memory of claim 36, the programs being designed to further cause the computer to:

receive one or more win bets, each win bet comprising a bet that a participant selected from the set of participants will win the event; and determine the win bets that comprise a bet on the winning participant.

38. The non-transitory computer-readable tangible memory of claim 37, wherein the amount of the group bet payout is determined based at least in part on the total amount of the win bets that comprise a bet on the winning participant, wherein the act of receiving one or more group bets comprises receiving a first group bet made by a bettor, and wherein the act of receiving the first group bet comprises receiving from the bettor a single amount representing an amount at risk in the first group bet.

39. The non-transitory computer-readable tangible memory of claim 37, the programs being designed to further cause the computer to:

determine a payout amount for at least one of the group bets based at least in part on win payout odds for a participant excluded from the subset corresponding to the group bet.

40. The non-transitory computer-readable tangible memory of claim 36, the programs being designed to further cause the computer to:

allocate the amounts of the group bets to the corresponding participants, and determining the payout on the group bet based at least in part on the payout calculation used for win bets on the corresponding designated participants.

41. The non-transitory computer-readable tangible memory of claim 40, the programs being designed to further cause the computer to:

allocate the amounts of the group bets to the corresponding participants substantially inversely proportionally, so that the pay amount for the group bets will be substantially the same whichever participant of the corresponding designated subset is the winner.

42. The non-transitory computer-readable tangible memory of claim 36, wherein at least one of the designated subsets designates all but one of the participants.

43. The non-transitory computer-readable tangible memory of claim 36:

wherein programs calculate to provide payoff of the group bet that is substantially equal for a win by any participant of the subset; and the programs being designed to further cause the computer to, on receiving an indication of the winning participant at the betting system, determine payout amounts for the group bets based on whether the winning participant is a member of the bets' respective specified subsets, such that the payouts for each winning group bet is substantially uniform regardless of which particular participant in the winning bet's respective subset is the winning participant, with no substantial effect on payoff amount based on the second-place finisher.

44. A method comprising the steps of:

receiving, at a computer of a betting computer system platform, via a computer network, from betting computer system interfaces, data representing one or more win bets, each win bet comprising a bet that a specified participant selected from a set of participants in an event will win the event;

receiving, at the computer of the betting computer system platform, via the computer network, from betting computer system interfaces, data representing one or more group bets, wherein each group bet has an associated bet amount, and specifies a respective subset having a plurality of the participants selected from among set of participants, being a bet that any participant of the subset will win the event;

receiving, at the computer of the betting computer system platform, via a payment acceptor, payment associated with one or more bets;

allocating, the computer of the betting computer system platform, data representing a portion of the bet amount for group bets among the participants of the respective subsets specified by respective group bets, wherein odds for participants in the subsets are not required to be the same, and the portion allocated to each participant is inversely proportional to odds associated with that participant such that payout for a group bet is substantially the same regardless of which participant among a subset of the participants is the winning participant; and on receiving an indication of the winning participant at the computer of the betting computer system platform, determining by the betting computer system platform, data representing payout amounts for the group bets based on an odds determined for win bets on the participant that wins the event, and the respective amounts of the group bets allocated to the winning participant.

45. The method of claim 44, wherein the win bets and the group bet are received in a pari-mutuel betting system, wherein the act of receiving one or more group bets comprises receiving a first group bet made by a bettor, and wherein the act of receiving the first group bet comprises receiving from the bettor a single amount representing an amount at risk in the first group bet.

46. The method of claim 44, further comprising applying a commission rate to at least one of the win bets and the group bets.

47. The method of claim 44, wherein the subset of participants comprises a majority of the set of participants.

48. The method of claim 44, wherein the payoff of each group bet is substantially equal for a win by any participant of the bet's respective subset with no substantial effect on the payoff based on the second-place finisher.

49. The method of claim 44, wherein, at least some of the group bets specify subsets with four or more participants.

50. The method of claim 44, wherein the amount of the group bet payout is determined based at least in part on the total amount of the win bets that comprise a bet on the winning participant.

51. The method of claim 44, wherein a particular participant in the set of participants is not included in the subset of participants, and the method further comprises:

determining the odds of winning for the particular participant based at least in part on the one or more received win bets; and wherein the amount of the group bet payout is determined based at least in part on the odds of winning for the particular participant.

52. The method of claim 44, wherein the odds associated with a particular participant are based at least in part on the total amount of the win bets that comprise a bet on any participant in the set of participants except for the particular participant.

53. The method of claim 44, further comprising:

receiving a notification that one or more of the participants will not compete in the event; and canceling at least one of the one or more group bets.

54. The method of claim 44, further comprising:

receiving a notification that one or more of the participants in the subset of participants will not compete in the event; and reallocating the bet amount for the particular group bet among the remaining participants in the subset of participants.

55. The method of claim 44, wherein determining the amount of the group bet payout further comprises:

determining as a first amount the portion of the group bet allocated to the winning participant;

determining as a second amount the total portion of the group bet allocated among the participants in the set of participants except for the winning participant;

determining as a third amount the total amount of the win bets that comprise a bet on any of the participants in the set of participants except for the winning participant;

determining as a fourth amount the total amount of the win bets that comprise a bet on the winning participant; and determining the amount of the group bet payout based at least on the first amount, the second amount, the third amount, and the fourth amount.

56. The method of claim 44, wherein determining an amount of a win bet payout for at least one of the win bets that comprise a bet on the winning participant comprises:

determining as a first amount the total amount of the win bets that comprise a bet on the winning participant;

determining as a second amount the total portion of the group bet allocated among the participants in the set of participants except for the winning participant;

determining as a third amount the total amount of the win bets that comprise a bet on any of the participants in the set of participants except for the winning participant;

determining as a fourth amount the total portion of the group bet allocated to the winning participant; and determining the amount of the payout for at least one of the win bets that comprise a bet on the winning participant based at least on the first amount, the second amount, the third amount, and the fourth amount.

57. The method of claim 56, wherein determining the amount of the payout for at least one of the win bets that comprise a bet on the winning participant comprises:

determining a fifth amount by multiplying the sum of the second amount and the third amount by the first amount;

determining a sixth amount by dividing the fifth amount by the sum of the first amount and fourth amount; and adding the sixth amount and the first amount.

58. A non-transitory tangible computer-readable memory having embodied therein one or more programs designed to cause one or more computers of a betting computer system platform to:

receive, at a computer of a betting computer system platform, via a computer network, from betting computer system interfaces, data representing one or more win bets, each win bet comprising a bet that a specified participant selected from a set of participants in an event will win the event; and receive, at the computer of the betting computer system platform, via the computer network, from betting computer system interfaces, data representing one or more group bets, wherein each group bet has an associated bet amount, and specifies a respective subset having a plurality of the participants selected from among set of participants, being a bet that any participant of the subset will win the event; and receiving, at the computer of the betting computer system platform, via a payment acceptor, payment associated with one or more bets;

allocate, by the computer of the betting computer system platform, data representing a portion of the bet amount for group bets among the participants of the respective subsets specified by respective group bets, wherein odds for participants in the subsets are not required to be the same, and the portion allocated to each participant is inversely proportional to odds associated with that participant such that payout for a group bet is substantially the same regardless of which participant among a subset of the participants is the winning participant; and on receiving an indication of the winning participant at the betting system, determine, by the computer of the betting computer system platform, data representing payout amounts for the group bets based on an odds determined for win bets on the participant that wins the event, and the respective amounts of the group bets allocated to the winning participant.

59. The memory of claim 58, wherein the payoff of each group bet is substantially equal for a win by any participant of the bet's respective subset with no substantial effect on the payoff based on the second-place finisher, wherein the act of receiving one or more group bets comprises receiving a first group bet made by a bettor, and wherein the act of receiving the first group bet comprises receiving from the bettor a single amount representing an amount at risk in the first group bet.

60. The memory of claim 58, wherein at least some of the group bets specify subsets with four or more participants.

61. The memory of claim 58, wherein the subset of participants comprises a majority of the set of participants.

62. The memory of claim 58, wherein the processor is operable to determine the amount of the group bet payout based at least in part on the total amount of the win bets that comprise a bet on the winning participant.

63. The memory of claim 58, wherein the odds associated with a particular participant are based at least in part on the total amount of the win bets that comprise a bet on any participant in the set of participants except for the particular participant.

64. The memory of claim 58, wherein the processor is further operable to:

receive a notification that one or more of the participants in the subset of participants will not compete in the event; and reallocate the bet amount for the particular group bet among the remaining participants in the subset of participants.

65. The memory of claim 58, further comprising determining, for each participant in the set of participants, the total amount of the win bets that comprise a bet on that participant; and wherein the bet amount for the particular group bet is allocated to each participant in the subset of participants in proportion to the determined total amounts of the win bets associated with that participant.

66. A method comprising:

receiving at a computer of a betting computer system platform of a computerized betting system, via a computer network, from betting computer system interfaces, data representing one or more group bets, wherein each group bet specifies a respective subset of a set of participants in an event, being a bet that any participant of the specified subset will win the event, the payoff of the group bet being substantially equal for a win by any participant of the subset with no substantial effect on the payoff based on the second-place finisher; and receiving, at the computer of the betting computer system platform, via a payment acceptor, payment associated with one or more bets;

on receiving an indication of the winning participant at the computer of the betting computer system platform, determining, by the computer of the betting computer system platform, data representing payout amounts for the group bets based on whether the winning participant is a member of the bets' respective specified subsets, such that the payouts for each winning group bet is substantially uniform regardless of which particular participant in the winning bet's respective subset is the winning participant, with no substantial effect on payoff amount based on the second-place finisher.

67. The method of claim 66, wherein at least some of the group bets specify subsets with four or more participants, wherein the act of receiving one or more group bets comprises receiving a first group bet made by a bettor, and wherein the act of receiving the first group bet comprises receiving from the bettor a single amount representing an amount at risk in the first group bet.

68. The method of claim 66, further comprising the steps of:

allocating a portion of the bet amount for group bets among the participants of the respective subsets specified by respective group bets, the portion allocated to each participant is inversely proportional to odds associated with that participant such that payout for a group bet is the substantially uniform regardless of which participant among a subset of the participants is the winning participant.

69. The method of claim 66, wherein the subset of participants comprises a majority of the set of participants.

70. The method of claim 66, wherein the amount of the group bet payout is determined based at least in part on the total amount of the win bets that comprise a bet on the winning participant.

71. The method of claim 66, wherein the odds associated with a particular participant are based at least in part on the total amount of the win bets that comprise a bet on any participant in the set of participants except for the particular participant.

72. The method of claim 66, further comprising:

receiving a notification that one or more of the participants will not compete in the event; and canceling at least one of the one or more group bets.

73. The method of claim 66, further comprising:

receiving a notification that one or more of the participants in the subset of participants will not compete in the event; and reallocating the bet amount for the particular group bet among the remaining participants in the subset of participants.

74. The method of claim 66, further comprising determining, for each participant in the set of participants, the total amount of the win bets that comprise a bet on that participant; and wherein the bet amount for the particular group bet is allocated to each participant in the subset of participants in proportion to the determined total amounts of the win bets associated with that participant.

75. A tangible non-transitory computer-readable memory having embodied therein one or more programs designed to cause one or more computers of a betting computer system platform to:

receive at the computer of a computerized the betting computer system platform, via a computer network, from betting computer system interfaces, data representing one or more group bets, wherein each group bet specifies a respective subset of a set of participants in an event, being a bet that any participant of the specified subset will win the event, the payoff of the group bet being substantially equal for a win by any participant of the subset with no substantial effect on the payoff based on the second-place finisher; and receiving, at the computer of the betting computer system platform, via a payment acceptor, payment associated with one or more bets;

on receiving an indication of the winning participant at the computer of the betting computer system platform, determine, by computer of the betting computer system platform, data representing payout amounts for the group bets based on whether the winning participant is a member of the bets' respective specified subsets, such that the payouts for each winning group bet is substantially uniform regardless of which particular participant in the winning bet's respective subset is the winning participant, with no substantial effect on payoff amount based on the second-place finisher.

76. The memory of claim 75, wherein at least some of the group bets specify subsets with four or more participants, wherein the act of receiving one or more group bets comprises receiving a first group bet made by a bettor, and wherein the act of receiving the first group bet comprises receiving from the bettor a single amount representing an amount at risk in the first group bet.

77. The memory of claim 75, the program(s) being further programmed to:

allocate a portion of the bet amount for group bets among the participants of the respective subsets specified by respective group bets, the portion allocated to each participant is inversely proportional to odds associated with that participant such that payout for a group bet is the substantially uniform regardless of which participant among a subset of the participants is the winning participant.

78. A method comprising:

receiving at a computer of a betting computer system platform, via a computer network, from betting computer system interfaces, data representing one or more group bets, wherein each group bet specifies a respective subset of a set of participants in an event, being a bet that any participant of the specified subset will win the event, the payoff of the group bet being substantially equal for a win by any participant of the subset, at least some of the group bets specifying subsets with four or more participants; and receiving, at the computer of the betting computer system platform, via a payment acceptor, payment associated with one or more bets;

on receiving an indication of the winning participant at the computer of the betting computer system platform, determining by the computer of the betting computer system platform, data representing payout amounts for the group bets based on whether the winning participant is a member of the bets' respective specified subsets, such that the payouts for each winning group bet is substantially uniform regardless of which particular participant in the winning bet's respective subset is the winning participant.

79. The method of claim 78, further comprising the steps of:

allocating a portion of the bet amount for group bets among the participants of the respective subsets specified by respective group bets, the portion allocated to each participant is inversely proportional to odds associated with that participant such that payout for a group bet is the substantially uniform regardless of which participant among a subset of the participants is the winning participant.

80. The method of claim 78, wherein the payoff of each group bet is substantially equal for a win by any participant of the bet's respective subset with no substantial effect on the payoff based on the second-place finisher, wherein the act of receiving one or more group bets comprises receiving a first group bet made by a bettor, and wherein the act of receiving the first group bet comprises receiving from the bettor a single amount representing an amount at risk in the first group bet.

81. A non-transitory tangible computer-readable memory having embodied therein one or more programs designed to cause one or more computers of a betting computer system platform to:

receive at a computer of a betting computer system platform, via a computer network, from betting computer system interfaces, data representing one or more group bets, wherein each group bet specifies a respective subset of a set of participants in an event, being a bet that any participant of the specified subset will win the event, the payoff of the group bet being substantially equal for a win by any participant of the subset, at least some of the group bets specifying subsets with four or more participants; and receiving, at the computer of the betting computer system platform, via a payment acceptor, payment associated with one or more bets;

on receiving an indication of the winning participant at the computer of the betting computer system platform, determine, by the computer of the betting computer system platform, data representing payout amounts for the group bets based on whether the winning participant is a member of the bets' respective specified subsets, such that the payouts for each winning group bet is substantially uniform regardless of which particular participant in the winning bet's respective subset is the winning participant.

82. The memory of claim 81, the program(s) being further programmed to:

allocating a portion of the bet amount for group bets among the participants of the respective subsets specified by respective group bets, the portion allocated to each participant is inversely proportional to odds associated with that participant such that payout for a group bet is the substantially uniform regardless of which participant among a subset of the participants is the winning participant.

83. The memory of claim 81, wherein the payoff of each group bet is substantially equal for a win by any participant of the bet's respective subset with no substantial effect on the payoff based on the second-place finisher, wherein the act of receiving one or more group bets comprises receiving a first group bet made by a bettor, and wherein the act of receiving the first group bet comprises receiving from the bettor a single amount representing an amount at risk in the first group bet.

84. A method, comprising:

receiving at a computer of a betting computer system platform, via a computer network, from betting computer system interfaces, data representing one or more win bets, each win bet comprising a bet that a specified participant selected from a set of participants in an event will win the event;

receiving at the computer of the betting computer system platform, via the computer network, from betting computer system interfaces, data representing one or more group bets, wherein each group bet has an associated bet amount, and specifies a respective subset having a plurality of the participants selected from among set of participants, being a bet that any participant of the subset will win the event, the payoff of the group bet being substantially equal for a win by any participant of the subset with no substantial effect on the payoff based on the second-place finisher, at least some of the group bets specifying subsets with four or more participants;

receiving, at the computer of the betting computer system platform, via a payment acceptor, payment associated with one or more bets;

allocating, by the computer of the betting computer system platform, data representing a portion of the bet amount for group bets among the participants of the respective subsets specified by respective group bets, wherein odds for participants in the subsets are not required to be the same, and the portion allocated to each participant is inversely proportional to odds associated with that participant such that payout for a group bet is substantially the same regardless of which participant among a subset of the participants is the winning participant; and on receiving an indication of the winning participant at the computer of the betting computer system platform, determining, the computer of the betting computer system platform, data representing payout amounts for the group bets based whether the winning participant is a member of the bets' respective specified subsets and on an odds determined for win bets on the participant that wins the event, and the respective amounts of the group bets allocated to the winning participant, such that the payouts for each winning group bet is substantially uniform regardless of which particular participant in the winning bet's respective subset is the winning participant, with no substantial effect on payoff amount based on the second-place finisher.

85. The non-transitory computer-readable tangible memory of claim 36:

wherein the payoff of the group bet being substantially equal for a win by any participant of the subset with no substantial effect on the payoff based on the second-place finisher; and on receiving an indication of the winning participant at the betting system, determine payout amounts for the group bets based on whether the winning participant is a member of the bets' respective specified subsets, with no substantial effect on payoff amount based on the second-place finisher, wherein the act of receiving one or more group bets comprises receiving a first group bet made by a bettor, and wherein the act of receiving the first group bet comprises receiving from the bettor a single amount representing an amount at risk in the first group bet.

* * * * *